United States Patent
Chi et al.

(10) Patent No.: US 11,430,138 B2
(45) Date of Patent: Aug. 30, 2022

(54) SYSTEMS AND METHODS FOR MULTI-FRAME VIDEO FRAME INTERPOLATION

(71) Applicants: Zhixiang Chi, North York (CA); Rasoul Mohammadi Nasiri, Toronto (CA); Zheng Liu, Toronto (CA); Jin Tang, Markham (CA); Juwei Lu, North York (CA)

(72) Inventors: Zhixiang Chi, North York (CA); Rasoul Mohammadi Nasiri, Toronto (CA); Zheng Liu, Toronto (CA); Jin Tang, Markham (CA); Juwei Lu, North York (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/102,114

(22) Filed: Nov. 23, 2020

(65) Prior Publication Data

US 2021/0279840 A1    Sep. 9, 2021

Related U.S. Application Data

(60) Provisional application No. 62/985,524, filed on Mar. 5, 2020.

(51) Int. Cl.
*G06T 7/246* (2017.01)
*G06N 3/08* (2006.01)

(52) U.S. Cl.
CPC ............. *G06T 7/251* (2017.01); *G06N 3/084* (2013.01); *G06T 2207/10016* (2013.01); *G06T 2207/20081* (2013.01); *G06T 2207/20084* (2013.01)

(58) Field of Classification Search
CPC .... G06N 3/084; G06N 3/0481; G06N 3/0454; G06N 3/08; G06N 3/02–088;
(Continued)

(56) References Cited

U.S. PATENT DOCUMENTS

| 11,122,238 B1* | 9/2021 | van Amersfoort .... G06T 3/4007 |
| 2007/0291844 A1* | 12/2007 | Lu ......................... H04N 19/577 |
| | | 375/240.26 |

(Continued)

FOREIGN PATENT DOCUMENTS

| CN | 109949221 A | 6/2019 |
| WO | 2019168765 A1 | 9/2019 |

OTHER PUBLICATIONS

Zhang, Haoxian, Ronggang Wang, and Yang Zhao. "Multi-frame pyramid refinement network for video frame interpolation." IEEE Access 7 (2019): 130610-130621. (Year: 2019).*

(Continued)

*Primary Examiner* — Geoffrey E Summers

(57) ABSTRACT

Systems and methods for multi-frame video frame interpolation. Higher-order motion modeling, such as cubic motion modeling, achieves predictions of intermediate optical flow between multiple interpolated frames, assisted by relaxation of the constraints imposed by the loss function used in initial optical flow estimation. A temporal pyramidal optical flow refinement module performs coarse-to-fine refinement of the optical flow maps used to generate the intermediate frames, focusing a proportionally greater amount of refinement attention to the optical flow maps for the high-error middle frames. A temporal pyramidal pixel refinement module performs coarse-to-fine refinement of the generated intermediate frames, focusing a proportionally greater amount of refinement attention to the high-error middle frames. A generative adversarial network (GAN) module calculates a loss function for training the neural networks used in the (Continued)

optical flow estimation module, temporal pyramidal optical flow refinement module, and/or temporal pyramidal pixel refinement module.

20 Claims, 17 Drawing Sheets

(58) Field of Classification Search
CPC . G06T 2207/20084; G06T 2207/20081; G06T 7/251; G06T 7/269; G06T 7/20–292; G06T 2207/10016; G06T 3/40
See application file for complete search history.

(56) References Cited

U.S. PATENT DOCUMENTS

| | | | |
|---|---|---|---|
| 2017/0221218 A1* | 8/2017 | Taggart | G06T 7/207 |
| 2018/0091768 A1 | 3/2018 | Adsumilli et al. | |
| 2019/0138889 A1* | 5/2019 | Jiang | G06T 7/251 |

OTHER PUBLICATIONS

Hu, Wenchao, and Zhiguang Wang. "A Multi-frame Video Interpolation Neural Network for Large Motion." Chinese Conference on Pattern Recognition and Computer Vision (PRCV). Springer, Cham, 2019. (Year: 2019).*
Nah, Seungjun, et al. "AIM 2019 challenge on video temporal super-resolution: Methods and results." 2019 IEEE/CVF International Conference on Computer Vision Workshop (ICCVW). IEEE, 2019. (Year: 2019).*
Xu, Xiangyu, et al. "Quadratic video interpolation." Advances in Neural Information Processing Systems 32 (2019). (Year: 2019).*
International Search Report, dated Apr. 22, 2021, application No. PCT/CN2021/073451.
Baker, S. et al., "A Database and Evaluation Methodology for Optical Flow", International Journal of Computer Vision, 92(1), 1-31 (2011).
Bao, W. et al., "Depth-Aware Video Frame Interpolation", IEEE Conference on Computer Vision and Pattern Recognition (2019).
Bao, W. et al, "MEMC-Net: Motion Estimation and Motion Compensation Driven Neural Network for Video Interpolation and Enhancement", arXiv preprint arXiv:1810.08768 (2018).
Dosovitskiy, A. et al., "FlowNet: Learning Optical Flow with Convolutional Networks", Proceedings of the IEEE International Conference on Computer Vision, pp. 2758-2766 (2015).
Goodfellow, I. et al., "Generative Adversarial Nets", Advances in Neural.
Ilg, E. et al., "FlowNet 2.0: Evolution of Optical Flow Estimation with Deep Networks", Proceedings of the IEEE Conference on Computer Vision and Pattern Recognition, pp. 2462-2470 (2017).
Jaderberg, M. et al., "Spatial Transformer Networks", Advances in Neural Information Processing Systems, pp. 2017-2025 (2015).
Jiang, H. et al., "Super SloMo: High Quality Estimation of Multiple Intermediate Frames for Video Interpolation", Proceedings of the IEEE Conference on Computer Vision and Pattern Recognition, pp. 9000-9008 (2018).
Kingma, D.P. et al., "A Method for Stochastic Optimization", arXiv preprint arXiv:1412.6980 (2014).
Ledig, C. et al., "Photo-Realistic Single Image Super-Resolution Using a Generative Adversarial Network", Proceedings of the IEEE Conference on Computer Vision and Pattern Recognition, pp. 4681-4690 (2017).
Liu, Y.L. et al., "Deep Video Frame Interpolation Using Cyclic Frame Generation", AAAI Conference on Artificial Intelligence (2019).
Liu, Z. et al., "Video Frame Synthesis Using Deep Voxel Flow", Proceedings of the IEEE International Conference on Computer Vision, pp. 4463-4471 (2017).
Nah, S. et al, "Deep Multi-Scale Convolutional Neural Network for Dynamic Scene Deblurring", Proceedings of the IEEE Conference on Computer Vision and Pattern Recognition, pp. 3883-3891 (2017).
Niklaus, S. et al., "Context-aware Synthesis for Video Frame Interpolation", Proceedings of the IEEE Conference on Computer Vision and Pattern Recognition, pp. 1701-1710 (2018).
Niklaus, S. et al, "Video Frame Interpolation via Adaptive Convolution", Proceedings of the IEEE Conference on Computer Vision and Pattern Recognition, pp. 670-679 (2017).
Niklaus, S. et al, Video Frame Interpolation via Adaptive Separable Convolution, Proceedings of the IEEE International Conference on Computer Vision, pp. 261-270 (2017).
Peleg, T. et al., "IM-Net for High Resolution Video Frame Interpolation", Proceedings of the IEEE Conference on Computer Vision and Pattern Recognition, pp. 2398-2407 (2019).
Perazzi, F. et al, "A Benchmark Dataset and Evaluation Methodology for Video Object Segmentation", Proceedings of the IEEE Conference on Computer Vision and Pattern Recognition, pp. 724-732 (2016).
Ranjan, A. et al., "Optical Flow Estimation Using a Spatial Pyramid Network", Proceedings of the IEEE Conference on Computer Vision and Pattern Recognition, pp. 4161-4170 (2017).
Su, S. e al., "Deep Video Deblurring for Hand-held Cameras", Proceedings of the IEEE Conference on Computer Vision and Pattern Recognition, pp. 1279-1288 (2017).
Sun, D. et al., "PWC-Net: CNNs For Optical Flow Using Pyramid, Warping, and Cost Volume", Proceedings of the IEEE Conference on Computer Vision and Pattern Recognition, pp. 8934-8943 (2018).
Xu, X. et al., "Quadratic Video Interpolation", Advances in Neural Information Processing Systems, pp. 1645-1654 (2019).
Xue, T. et al., "Video Enhancement with Task-Oriented Flow", International Journal of Computer Vision (IJCV), 127(8), pp. 1106-1125, (2019).
Yuan, L. et al. "Zoom-In-to-Check: Boosting Video Interpolation via Instance-level Discrimination", Proceedings of the IEEE Conference on Computer Vision and Pattern Recognition, pp. 12183-12191 (2019).
Zhang, H. et al, "Exploiting Temporal Consistency for Real-Time Video Depth Estimation", Proceedings of the IEEE International Conference on Computer Vision, pp. 1725{1734 (2019).
Zhang, H. et al., "Densely Connected Pyramid Dehazing Network" Proceedings of the IEEE Conference on Computer Vision and Pattern Recognition, pp. 3194-3203 (2018).

* cited by examiner (a) Vector-based  (b) Kernel-based

SYSTEMS AND METHODS FOR MULTI-FRAME VIDEO FRAME INTERPOLATION

RELATED APPLICATION DATA

The present application claims priority to U.S. Provisional Patent Application No. 62/985,524, filed Mar. 5, 2020, the entire contents of which are incorporated herein by reference.

TECHNICAL FIELD

The present disclosure relates to video frame interpolation, and in particular, to systems and methods for multi-frame video frame interpolation.

BACKGROUND

Video Frame Interpolation

Video frame interpolation aims to synthesize a frame of a digital video (referred to as an intermediate frame) as it would appear at a time step between two existing consecutive frames of the digital video. Given two existing consecutive frames of a digital video (a beginning frame and ending frame), a video frame interpolation system synthesizes one or more intermediate frames (interpolated intermediate frames) that appear to fill in the transition between the beginning and ending frames.

FIG. 1A illustrates a digital video including an existing starting video frame 102 (beginning frame 102), an existing ending video frame 104 (ending frame 104), and an interpolated intermediate video frame 106 (interpolated intermediate frame 106) synthesized by a video frame interpolation system. More generally, a video frame interpolation system synthesizes the interpolated intermediate frame 106 that includes an image that represents a moment of an object between two consecutive frames (i.e. the beginning frame 102 and the ending frame 104) in the digital video.

Most approaches to video interpolation combine the pixel values of the beginning frame 102 and ending frame 104 to determine an estimated motion of objects within the frames 102, 104 as follows:

$$I_t = f(I_0, I_1) \qquad \text{(Equation 1)}$$

where $I_t$ is the interpolated intermediate frame 106 at time t between two frames, $I_0$ is the beginning frame 102 and $I_1$ is ending frame 104. The values of the pixel at coordinate (x, y) comes from combining the pixels in the locations defined by motion vectors $(u_0, v_0)$ and $(u_1, v_1)$ corresponding to motion from $I_0$ and $I_1$ to $I_t$ to the time t:

$$I_t(x,y) = f(I_0(x-u_0, y-v_0), I_1(x-u_1, y-v_1)) \qquad \text{(Equation 2)}$$

Recent approaches to video frame interpolation use models that are constructed or built using machine learning algorithms based on sample video frames (hereinafter frames) of digital videos to synthesize interpolated intermediate frames based on a beginning frame and ending frame. For example, weights and biases of a neural network model for video frame interpolation are learned during training of such neural network models by feeding inputs with known desired outputs to the neural network model during training. During training of the neural network model, frames 1 and 3 of an existing video are input to the neural network, which synthesizes an interpolated intermediate frame based on frames 1 and 3, and outputs the interpolated intermediate frame. The interpolated intermediate frame is compared to frame 2 of the existing video based on an error function (i.e. loss function). This comparison generates an error (otherwise known as a loss) indicating the degree to which the synthesized interpolated frame output by the neural network model diverges from the ground truth (e.g. frame 2). A backpropagation algorithm is used to adjust (e.g. update) parameters of the neural network model. This process may be repeated using a large data set of video frames until the parameters of the model are tuned to generate output that closely matches the desired output, i.e. when fed frames 1 and 3 of an existing video, the trained neural network model synthesizes an interpolated intermediate frame that closely matches frame 2 of the existing video. At this stage, the neural network model may be referred to as a trained model.

Recent approaches to video frame interpolation are typically either vector-based or kernel-based. Vector-based video frame interpolation approaches rely on the estimation of the bidirectional dense optical flow from a pair of consecutive frames of a video. Then, using the estimated optical flow between the pair of consecutive frames of the video, pixel remapping is performed to synthesize an interpolated intermediate frame between the pair of consecutive frames of the video. An interpolated intermediate frame is typically synthesized based on the following formula:

$$I_t(x,y) = m \cdot I_1(x-u, y-v) + (1-m) \cdot I_2(x,y) \qquad \text{(Equation 3)}$$

where $I_1$ and $I_2$ are the beginning and ending frames, $I_t$ is the interpolated intermediate frame, x and y are pixel coordinates, m is a blending mask, and u and v are the optical flow vector.

As an alternative to vector-based video frame interpolation approaches, kernel-based video frame interpolation approaches synthesize the pixel values of the interpolated intermediate frame by performing convolution on any input patches from the pair of sequential, consecutive frames of a digital video with predicted spatially adaptive kernels. Specifically, for each pixel in the target interpolated intermediate frame, the kernel-based approach generates a kernel, for example a rectangular 41×41 matrix. Finally, the pixel value in the output interpolated intermediate frame is computed by applying the kernel on the neighborhood of the beginning and ending frame pixel using the dot product.

FIG. 1B illustrates the basic operation of kernel-based and vector-based approaches. A vector-based video frame interpolation approach 120 synthesizes a pixel (x, y) 126 of the interpolated intermediate frame $I_{t+1}$ 106 by applying optical flow vector (u, v) 122 to synthesize an interpolated pixel value based on a corresponding pixel value at (x+u, y+v) 124 of the beginning frame $I_t$ 102. Thus, $I_{t+1}(x, y) = f(I_t(x+u, y+v))$.

The kernel-based video frame interpolation approach 130 instead generates a pixel (x, y) 136 of the interpolated intermediate frame $I_{t+1}$ 106 by applying the kernel K(x, y) 132 by dot product to the neighborhood P(x, y) 138 of the pixel (x, y) 134 of the beginning frame $I_t$ 102. Thus, $I_{t+1}(x, y) = K(x, y) \cdot P(x, y)$.

Multi-Frame Interpolation

Vector-based and kernel-based frame interpolation approaches have been applied to the problem of generating multiple intermediate frames, called multi-frame interpolation.

FIG. 2A shows an example of multi-frame interpolation, starting with a sequence of frames of a digital video (referred to hereinafter as a video sequence 100). The video sequence 100 includes a starting frame (beginning frame 102) and an ending frame (ending frame 104). Multi-frame interpolation generates not just a middle frame 106 at the midpoint between the beginning frame 102 and ending frame 104, but a number of intermediate frames at various timestamps between that of the beginning frame 102 and ending frame 104. Here, seven intermediate frames have been generated, from a first intermediate frame 108 at one/eighth of the temporal distance from the beginning frame 102 to ending frame 104, to a seventh intermediate frame 110 at seven/eighths of the temporal distance from the beginning frame 102 to ending frame 104. The fourth intermediate frame is the middle frame 106. In the context of this specification, the timestamp of the beginning frame 102 is referred to as t=0 and the timestamp of the ending frame 104 is referred to as t=1. Thus, the timestamp of the first intermediate frame 108 is 0.125, the timestamp of the middle frame 106 is 0.5, and the timestamp of the seventh intermediate frame 110 is 0.875.

Multi-frame interpolation approaches that use models constructed using machine learning algorithms use a similar training technique to that described above for single frame interpolation. In training, a non-consecutive beginning frame and ending frame are selected from a video sequence in a set of training data, and these two frames are provided to the supervised machine learning algorithm as input. The actual (ground truth) intermediate frames located in the video sequence from the training data between the two non-consecutive input frames are used as ground truth data for calculating the loss used to adjust the model parameters. This is repeated many times using a large set of beginning and ending input frames and corresponding ground truth intermediate frames.

Multi-frame interpolation approaches applied to a digital video may result in an interpolated video sequence usable as a slow-motion digital video, an adaptive video stream, a video sequence reconstructed to replace missing or damaged frames, or a high-frame-rate video sequence for high frame rate displays. In general, higher frame rates may provide a higher quality video with smoother motions. For example, while inserting one new frame between two sequential frames in a sequence of frames of a digital video makes the playback rate of the digital video twice as slow or twice as smooth, more than one new frame can be generated and inserted between two sequential frames in a sequence of frames to make the playback rate of the digital video even slower or smoother.

As noted above, one approach to single-frame interpolation is based on estimating optical flow between a consecutive pair of frames (e.g. two sequential frames) of a sequence of frames of a digital video and scaling this motion linearly to the middle frame to obtain the location of pixels in the middle frame. In multi-frame interpolation, motion between a beginning frame or ending frame and a middle frame (i.e. a frame corresponding to a timestamp midway between the timestamp of the beginning frame and the timestamp of the ending frame) is usually mapped by assuming a linear transition between the beginning frame and ending frame and scaling the motion vectors based on the relative time difference using a linear model. However, real world motions reflected in frames of a sequence of frames of a digital video follow a variety of complex non-linear trends, leading to discrepancies between actual motion and reconstructed motion in the interpolated frames.

Generating multiple frames may leverage single frame interpolation solutions by either a recursive approach or a time stamp insertion approach. In the recursive approach, insertion of a middle frame between two sequential frames is repeated multiple times. A typical single frame interpolation approach for generating one middle frame 106 (i.e. at the middle time step of a given pair) is utilized to generate one frame between two sequential frames of a digital video. Then recursively, in the next step, for each pair of initial and generated frames, an additional middle frame is generated.

FIG. 2B shows an example of recursive frame interpolation for inserting seven new frames where in the first level 112 one new frame is generated in the middle (middle frame 106 at t=0.5), and in the second level 114 two middle frames are generated and finally in the third level 116 inserting one middle frame between each pair results in generating 4 additional new frames and in total seven frames are generated.

In the recursive multi-frame interpolation approach, the operations may be performed sequentially for different levels to reach a desired number of generated frames. It is generally not possible to run the operations in parallel, as each lower level relies on the generated frames of the upper levels. It also uses only information from two neighboring frames in generating a new frame. Another drawback of the recursive multi-frame interpolation approach is that it is not flexible with respect to the number of frames to generate: the generated frames are generally required to be in the shape of $2^{n-1}$ where n is the number of levels.

Other approaches for generating multiple intermediate frames having arbitrary timestamps between the beginning frame and ending frame. New intermediate frames can be generated one by one in the corresponding timestamps based on the assumption of linear movement from start frame to end frame. These approaches set a parameter to control the timestamp of the interpolated frame.

In these approaches, a new intermediate frame is inserted at any time t (0<t<1) between beginning frame 102 and ending frame 104. For generating multiple new intermediate frames between a given pair of frames in this approach, the time stamp corresponding to each new intermediate frame is used to generate the new intermediate frames as shown in FIG. 2C. This approach does not have the same limitations of the recursive multi-frame interpolation approach whose operations are in running in parallel; however, frame generation optimization cannot use the information from one generated new intermediate frame to optimize another new intermediate frame, and the operations in this process for each new intermediate frame are independent from the operations for others. It may not be efficient from a computation cost perspective, and there is a potential for time inconsistency and non-smoothness between generated new intermediate frames.

In view of the foregoing, improvements to multi-frame video frame interpolation approaches are desirable.

SUMMARY

The present disclosure provides systems and methods for video frame interpolation. Considering the challenges of the current single frame interpolation approaches for generating multiple new intermediate frames, such as complexity, flexibility, and temporal inconsistency, there is a need for a method for generating all new intermediate frames in one processing pass with high temporal consistency.

Some embodiments use higher-order motion modeling than existing multiple-frame video frame interpolation approaches, such as cubic motion modeling (as opposed to the quadratic or linear motion modeling used by existing approaches), to achieve more accurate predictions of intermediate optical flow between multiple interpolated new intermediate frames between a beginning frame and an ending frame of a sequence of frames of a digital video. A sequence of frames of a digital video is referred to hereinafter as a video sequence. In some embodiments, the high-order motion modeling is used in conjunction with relaxation of the constraints imposed by the loss function used in initial optical flow estimation. Some embodiments use a temporal pyramidal optical flow refinement module to perform coarse-to-fine refinement of the optical flow maps used to generate (e.g. interpolate) new intermediate frames between a beginning frame and an ending frame of a video sequence, focusing a proportionally greater amount of refinement attention to the optical flow maps for the high-error middle-most frames (i.e. the intermediate frames having a timestamp closest to the temporal midpoint between the beginning frame timestamp and the ending frame timestamp). Some embodiments use a temporal pyramidal pixel refinement module to perform coarse-to-fine refinement of the generated new intermediate frames, focusing a proportionally greater amount of refinement attention to the high-error middle-most frames. Some embodiments use a module which implements a generative adversarial network (GAN) to compute a loss for training of the neural networks implemented in the optical flow estimation module, temporal pyramidal optical flow refinement module, and/or temporal pyramidal pixel refinement module.

Some embodiments may improve upon limitations of existing video frame interpolation approaches. Some embodiments may generate multiple new intermediate frames between a beginning frame and an ending frame of a video sequence in one pass of processing. Some embodiments may consider temporal consistency by applying adaptive processing to the optical flow maps used to generate the intermediate frames, and/or to the generated intermediate frames themselves, to focus processing on the high-error middle-most frames. Some embodiments may apply a higher degree motion model than existing multiple-frame video frame interpolation approaches.

Some embodiments may provide fast and parallel multiple-frame video interpolation. The use of a temporal pyramidal refinement module for refinement of optical flow maps and/or intermediate frames in some embodiments may take the level of error of intermediate frames into account as a function of their temporal distance to the beginning frame and ending frame. Some embodiments may provide a video interpolation system that is extendable to generating (e.g. interpolating) any number of new intermediate frames between a beginning frame and an ending frame of a video sequence. In some embodiments, pyramidal processing can be used for any temporal processing of frames in a video sequence taking into account error propagation. Some embodiments can perform fast multiple-frame video frame interpolation approaches to generate ultra-super slow motion videos.

As used herein, the term "optical flow" refers to a representation of the motion of objects (such as pixels) between one video frame a another video frame. Thus, for example, if a specific pixel is present at (x, y) coordinate (100, 100) in a first video frame and at (110, 100) in a second video frame, the optical flow from the first frame to second frame at location (100, 100) may be represented as the vector (10, 0). A two-dimensional map showing the optical flow for each pixel location of the first frame may be referred to as an "optical flow map" representing the optical flow from the first frame to the second frame; in the present example, the optical flow map could be represented as a vector field having a value of (10, 0) at location (100, 100). Such an optical flow map showing optical flow from the first frame to the second frame, assuming that the first frame corresponds to a point in time prior to the second frame, may be referred to as representing "forward optical flow". A second optical flow map, representing "backward optical flow", i.e. movement of objects between the second frame and the first frame, could also be computed based on the locations of specific pixels of the second frame and their corresponding location in the first frame. A combination of a forward optical flow map and a backward optical flow map may be referred to as a "bidirectional optical flow map", whereas a single forward or backward optical flow map may be referred to as a "unidirectional optical flow map". Embodiments described herein may make use of either bidirectional or unidirectional optical flow maps, although bidirectional optical flow maps may provide additional information that may improve the accuracy or performance of the described embodiments. The term "optical flow map" may be assumed to refer to either a unidirectional or bidirectional optical flow map.

As used herein, the terms "middle frame" and "outer frame" refer to intermediate frames generated using interpolation between a beginning frame and an ending frame of an existing video sequence. A "middle" frame refers to an interpolated intermediate frame that is relatively far (in time) from both the beginning frame and the ending frame, in contrast to the "outer" frames that are relatively close (in time) to either the beginning frame or the ending frame. Thus, in an example in which seven intermediate frames (frames 1 through 7) are interpolated between a beginning frame at time t=0 and an ending frame at time t=8, the seven intermediate frames being located (in time) at t=1 through t=7 respectively, frames 1 and 7 may be considered the "outer-most" frames and frame 4 may be considered the "middle-most" frame. Embodiments described herein may devote relatively more processing resources to the refinement of middle frames relative to outer frames, as the temporal distance of the middle frames from the ground truth (i.e. the beginning frame and ending frame) tends to result in higher error in interpolation and therefore a greater need for refinement.

BRIEF DESCRIPTION OF THE DRAWINGS

Embodiments will now be described by way of examples with reference to the accompanying drawings, in which like reference numerals may be used to indicate similar features.

DESCRIPTION OF EXAMPLE EMBODIMENTS

Figure 1A:
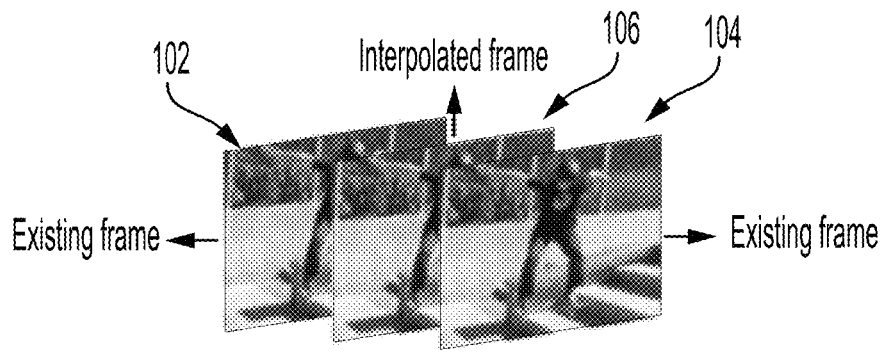
FIG. 1A is a diagram showing a digital video that includes a beginning frame, an interpolated intermediate frame, and an ending frame.
Figure 1B:
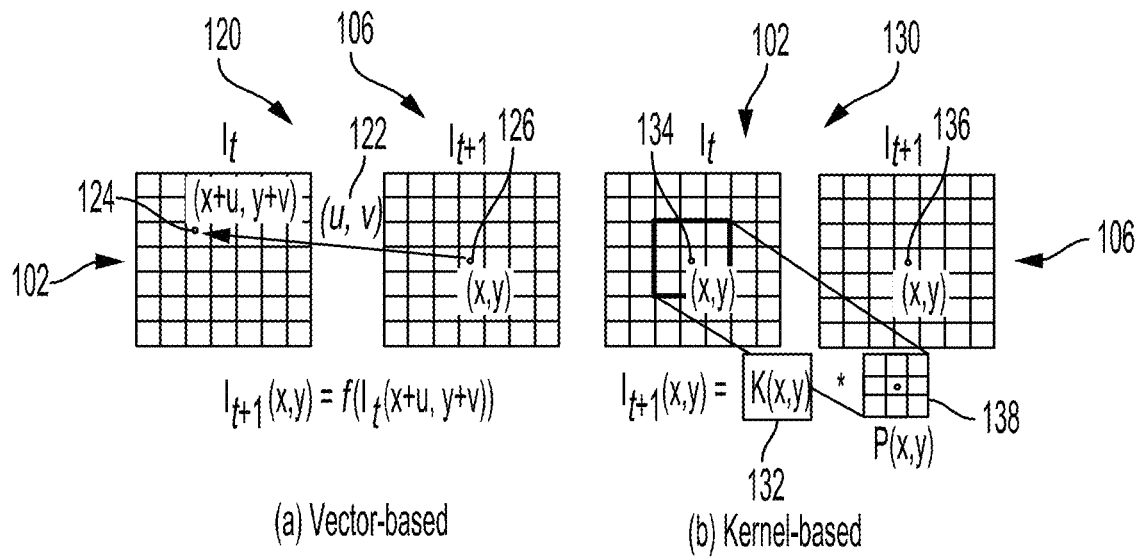
FIG. 1B is a diagram of a vector-based method for video frame interpolation and a kernel-based method of video frame interpolation.
Figure 2A:
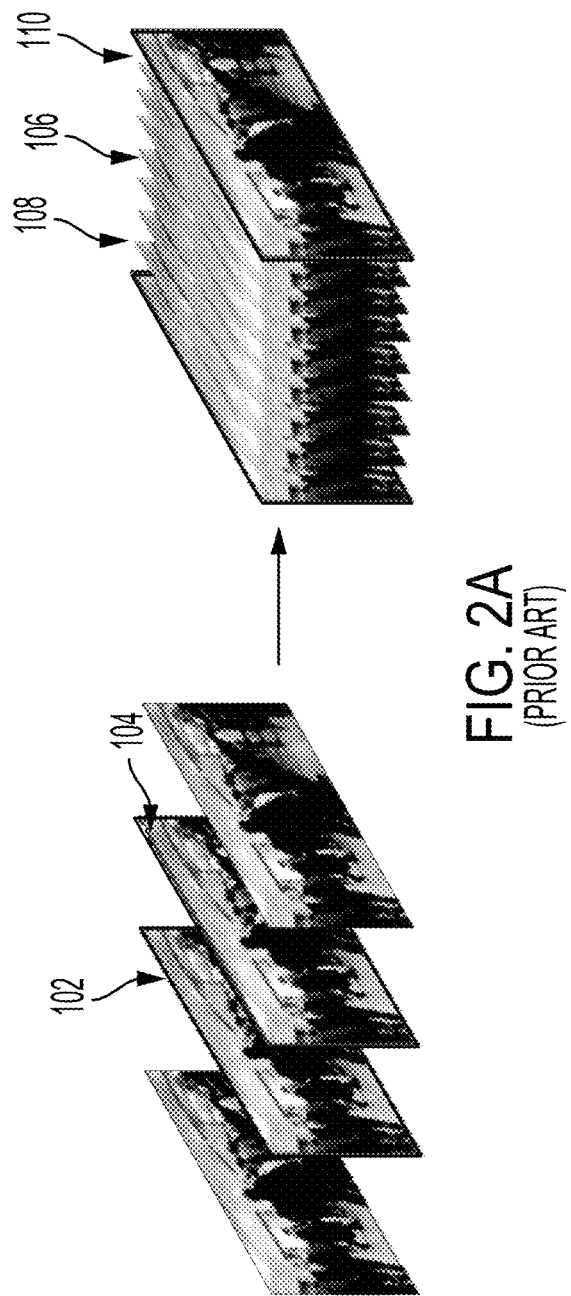
FIG. 2A is a diagram showing a video sequence that includes a beginning frame and an ending frame, which are used to generate seven interpolated intermediate frames.
Figure 2B:
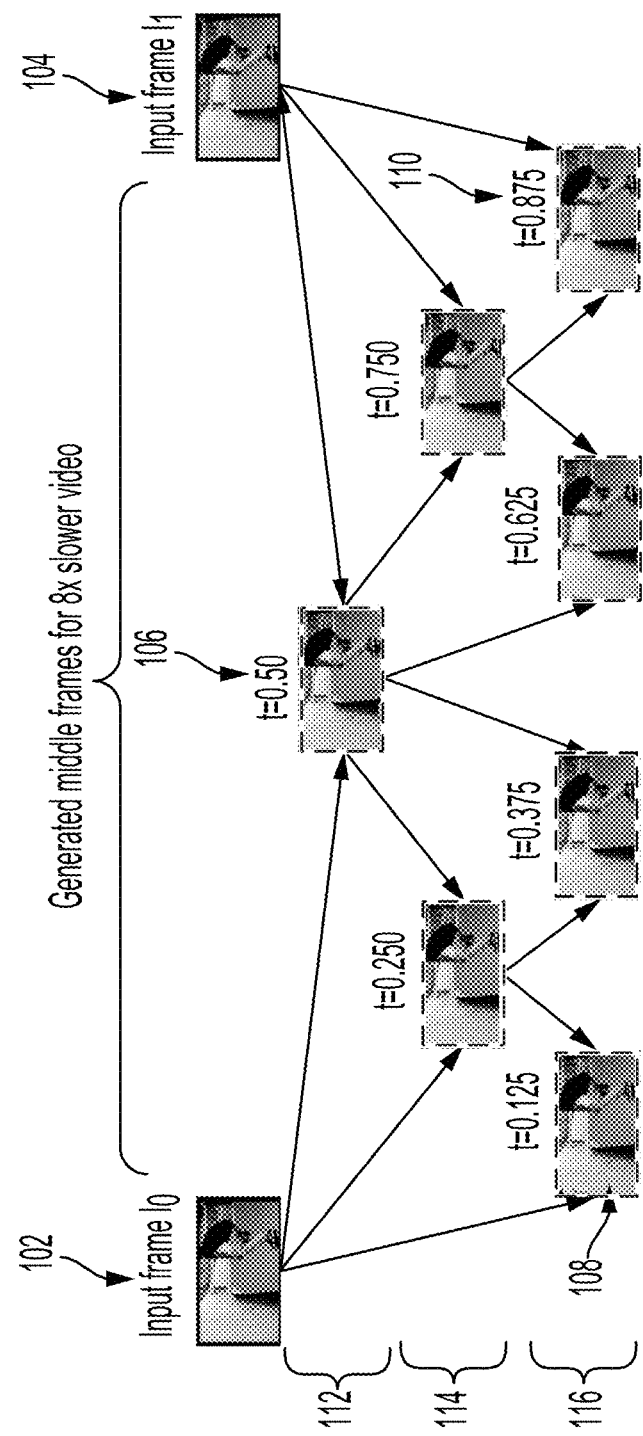
FIG. 2B is a schematic diagram showing a recursive middle-frame-insertion method of multi-frame interpolation.
Figure 2C:
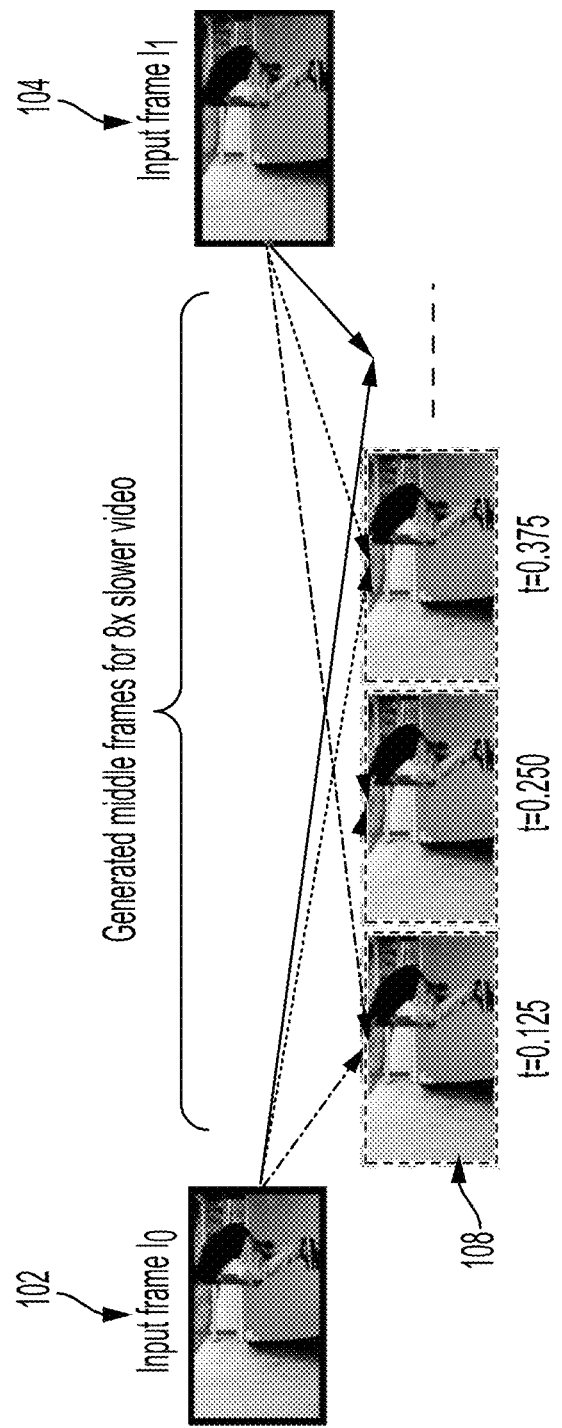
FIG. 2C is a schematic diagram showing a timestamp-based method of multi-frame interpolation.

As used here, a "module" can refer to component or part of a software system that includes machine-readable instructions executable by a processing unit of a computing system. A "module" can also refer to a combination of a hardware processing circuit and machine-readable instructions (software and/or firmware) executable by the hardware processing circuit. A processing unit can be a central processing unit (CPU) having a hardware accelerator, a tensor processing unit (TPU), or a neural processing unit (NPU). A hardware processing circuit can include any or some combination of a microprocessor, a core of a multi-core microprocessor, a microcontroller, an application specific programmable integrated circuit (ASIC), a field programmable gate array (FGPA), a central processing unit (CPU), a tensor processing unit, a neural processing unit, or another hardware processing circuit.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

Example embodiments of software systems, computing systems, and methods for video frame interpolation, and in particular multi-frame video interpolation, will now be described. Some example embodiments of software systems and computing systems use trained models to perform all or part of a video frame interpolation method. Some example embodiments of systems and devices include trained neural networks which perform all or part of a video frame interpolation method.

Existing multi-frame interpolation techniques generally process all the frames of a video sequence with the same importance; the expected level of difficulty for generating multiple intermediate frames between a beginning frame and an end frame of a sequence of frames of a video (referred to hereinafter as a video sequence) at different time stamps is not usually exploited. In fact, generating intermediate frames closer to one of the two initial frames of the video sequence (i.e. the starting frame and ending frame) is easier than the ones with larger temporal distance, as the motion scales up. Consequently, existing multi-frame interpolation systems implement machine learned models that are not optimized in terms of model size (i.e., the number of learned parameters of the model) or execution time, which makes them inapplicable (or not optimized) for user-facing software applications. To this end, some embodiments described herein may use a temporal pyramidal processing operation, which efficiently integrates multi-frame generation into one single neural network. Described embodiments may adaptively process lower-error intermediate interpolated frames (e.g., frames close to the beginning or ending frame) with shallow processing steps to guide the generation of higher-error intermediate interpolated frames (e.g., frames far from the beginning and ending frame) which are processed by deeper processing steps. Through joint optimization of all the intermediate frames, higher quality interpolated intermediate frames may be synthesized having higher temporal consistency across the sequence of intermediate interpolated frames.

In addition, most existing multi-frame video frame interpolation approaches synthesize the intermediate frames by simply assuming linear transition in motion between the beginning frame and ending frame. However, real world motions reflected in video frames follows a variety of complex non-linear trends. To overcome this limitation, an extension to the quadratic motion prediction model may be used. However, the quadratic motion prediction model, assuming constant acceleration among the input frames, may still be inadequate to model real world motion of objects in some cases, especially for non-rigid bodies. Forces applied to moving objects in the real world are not necessarily constant, resulting in variation in acceleration of objects or parts of objects. To address this issue, some embodiments may leverage the advantage of multi-frame input to implement an advanced high-order motion prediction model (e.g. cubic instead of quadratic) which accounts for variation in acceleration. Furthermore, some embodiments may boost the quality of motion prediction as well as the final interpolated intermediate frames by using a relaxed loss function during the training of an optical flow estimation neural network of an optical flow estimation module. This may provide the flexibility required to map the pixels to the neighbor of their ground truth locations at the reference frame while a better motion prediction for the intermediates frame can be achieved. Some embodiments may also optimize the optical flow estimation neural network size (i.e. a number of learned parameters of the trained neural network) and running time so that they are applicable for real world applications, especially on mobile devices.

It may be observed that there is a temporal distribution of error in multi-frame video frame interpolation.

Figure 3A:
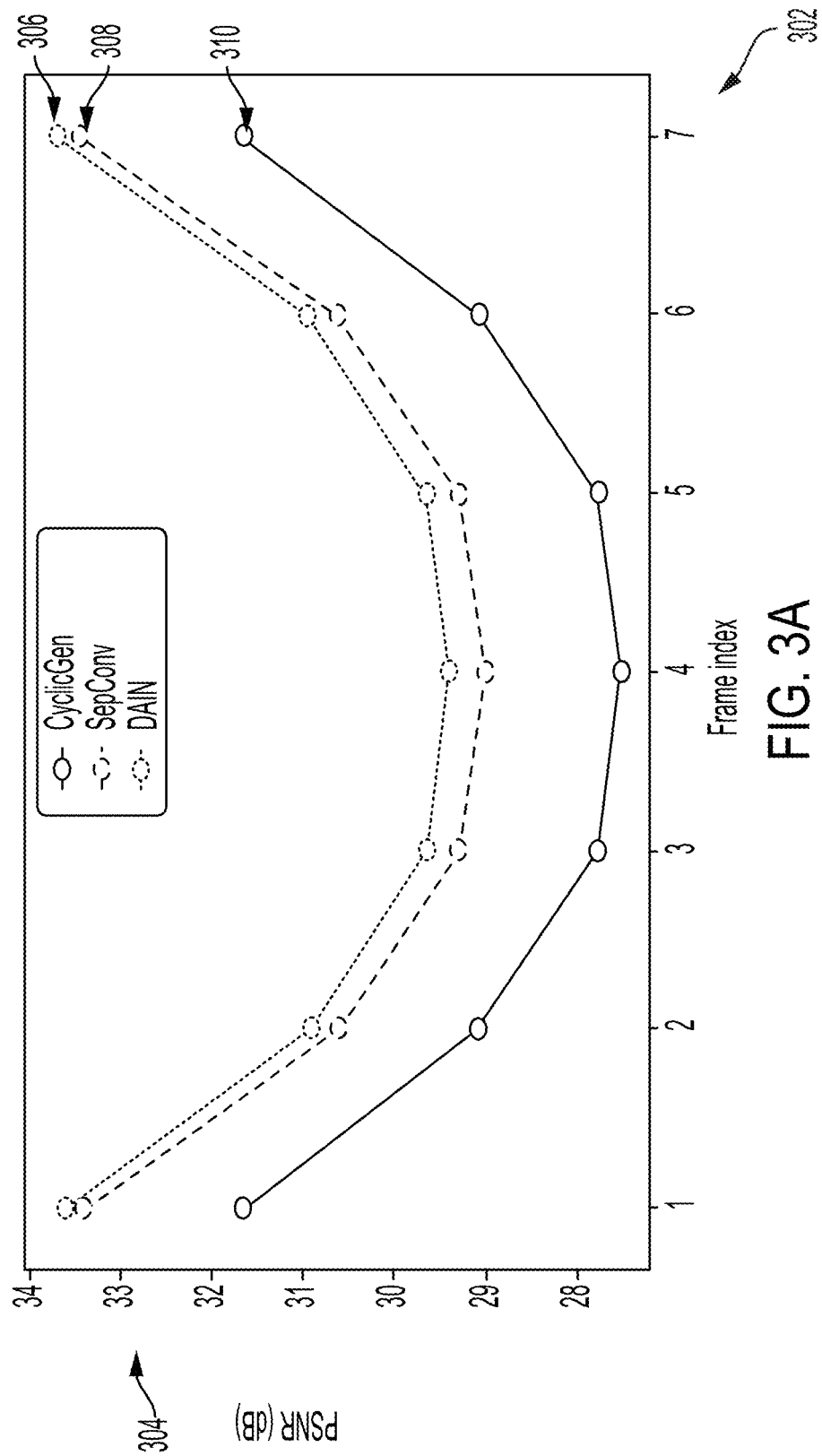
FIG. 3A is a graph of frame index of multiple interpolated frames against peak signal-to-noise ratio measured in decibels, showing the performance of three known techniques for multi-frame interpolation.

As shown in FIG. 3A, seven interpolated intermediate frames having frame indices 1 to 7 spaced along the horizontal X axis 302 have varying levels of peak signal-to-noise ratio (PSNR) as shown on the vertical Y axis 304. Each of three known multi-frame video frame interpolation approaches, DAIN 306, SepConv 308, and CyclicGen 310 is graphed, showing a consistent pattern of the middle-most interpolated intermediate frames (i.e. those closest to the midpoint between the beginning frame 102 and ending frame 104) having the lowest PSNR and therefore the highest level of error. This is to be expected, as new interpolated intermediate frames with timestamps closer to the beginning frame or ending frame are expected to have lower levels of error, whereas the middle frame 104 (here, the frame with frame index 4) is the farthest, temporally, from the ground truth frames (i.e. the beginning frame and ending frame).

It may also be observed that movement between frames may not be at a constant velocity.

Figure 3B:
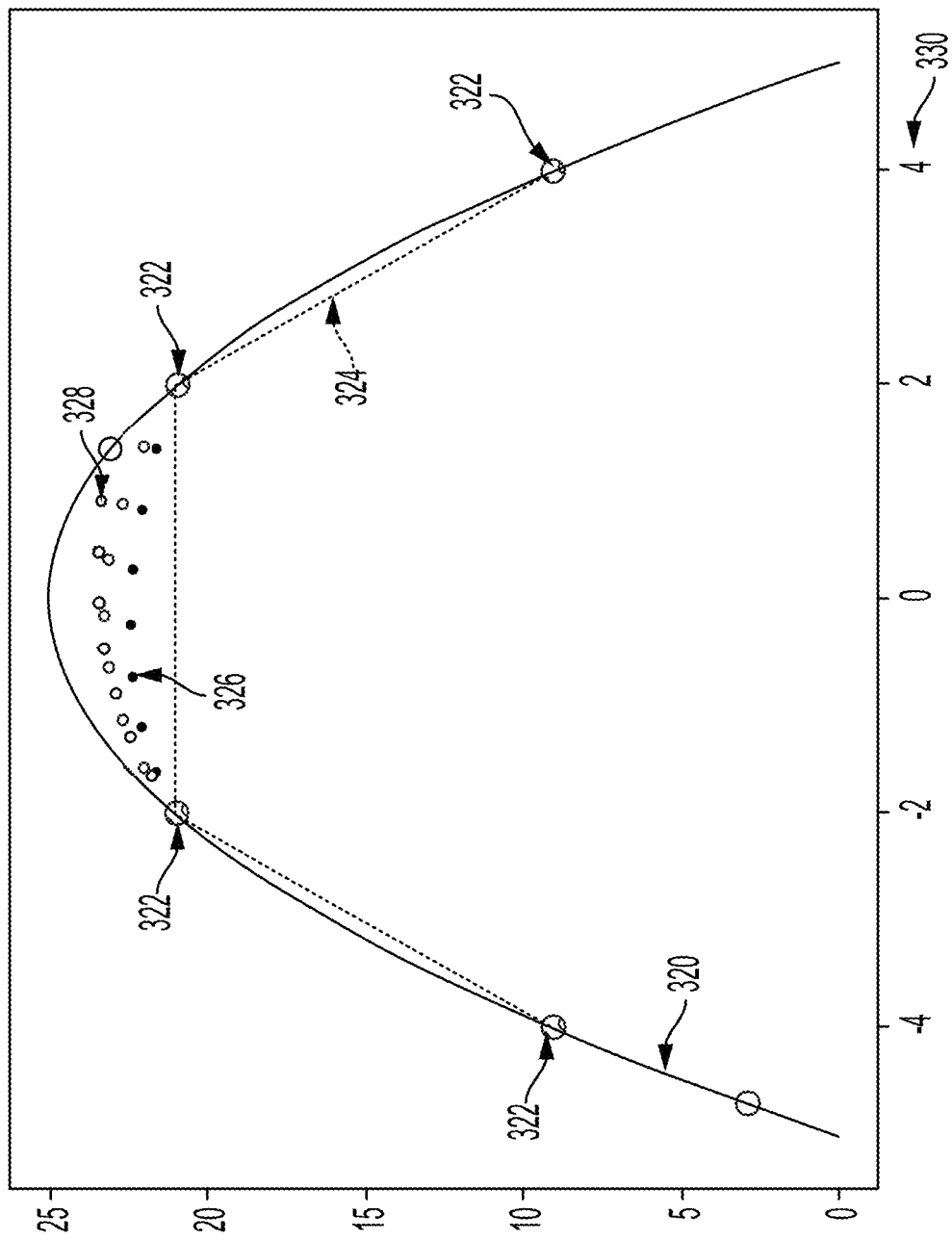
FIG. 3B is a graph of a time index against the position of an object in a frame, showing actual motion compared to several trajectories modeling motion in several multi-frame interpolation techniques.

In FIG. 3B, the solid curve 320 is the actual path of an object (e.g. a pixel in a frame) in a non-linear motion, and the points 322 (at time stamps 330 of −4, −2, 2, and 4) are the observation of the object's location on this path given by four input frames. The goal of motion modeling for video frame interpolation is to find the object's position at the time between −2 to 2 (i.e. the target interval for prediction, corresponding to the time period to be populated by the new interpolated intermediate frames) for each frame to be interpolated. The straight dotted lines 324 are the direct path between observations. The seven solid dots 326 in the target interval are the predicted points when modeling motion using the points 322. The solid points 326 are far from the actual path (i.e. solid curve 320).

The present described example embodiments of software systems, computing systems, and methods for video interpolation, and in particular multi-frame video interpolation, may address one or more of these observations to improve performance of multi-frame video frame interpolation. Some embodiments model the motion of objects within frames using motion prediction models having a higher order than existing multi-frame video frame interpolation approaches, such as cubic motion modeling (as opposed to, e.g., linear or quadratic motion modeling), to achieve more accurate predictions of intermediate optical flow between multiple interpolated intermediate frames. In some embodiments, the high-order motion modeling is used in conjunction with relaxation of the constraints imposed by the loss function used in training an optical flow estimation neural network implemented by an optical flow estimation module. Some embodiments use a temporal pyramidal optical flow refinement module to perform coarse-to-fine refinement of the optical flow maps used to generate the intermediate frames between the beginning frame and the ending frame by focusing a proportionally smaller amount of refinement attention to the optical flow maps for the low-error outermost frames (i.e. coarse refinement) and focusing a proportionally greater amount of refinement attention to the optical flow maps for the high-error middle-most frames. Some embodiments use a temporal pyramidal pixel refinement module to perform coarse-to-fine refinement of the generated intermediate frames, focusing a proportionally greater amount of refinement attention to the high-error middle frames. Some embodiments use a generative adversarial network (GAN) to calculate a loss function that is used during training of the neural networks implemented in the optical flow estimation module, temporal pyramidal optical flow refinement module, and/or temporal pyramidal pixel refinement module. Each of these modules will be described in detail in its own section.

Computing System

Figure 4:
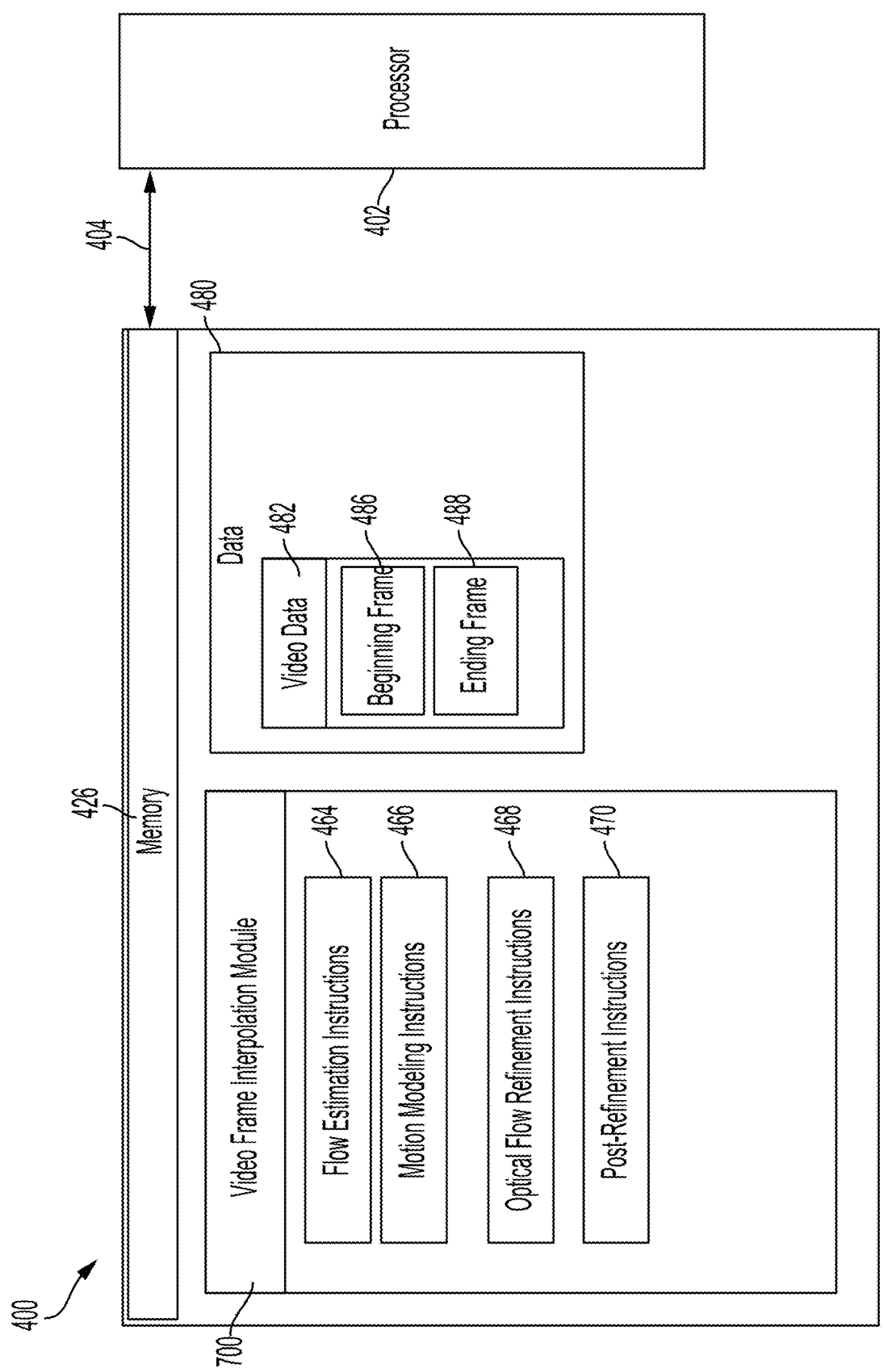
FIG. 4 is a block diagram of an example computing system for performing multi-frame interpolation according to example embodiments described herein.

FIG. 4 illustrates selected components of a computing system 400 for performing video frame interpolation, and in particular multi-frame video interpolation in accordance with an example embodiment of the present disclosure. The computing system 400 may in various embodiments be a physical computer (i.e., physical machine such as a desktop computer, a laptop, a server, etc.) or a virtual computer (i.e., virtual machine) provided by, for example, a cloud service provider. As shown in FIG. 4, the computing system 400 includes a processor 402 that is coupled to a memory 426 via a communication bus or communication link 404 which provides a communication path between the memory 426 and the processor 402. In some embodiments, the memory 426 may be a Random Access Memory (RAM), Read Only Memory (ROM), persistent (non-volatile) memory such as flash erasable programmable read only memory (EPROM) (flash memory. The processor 402 may include one or more processing units, including for example one or more central processing units (CPUs), one or more graphical processing units (GPUs), one or more tensor processing units (TPUs), and other processing units. The processor 402 may also include one or more hardware accelerators.

The memory 426 of the computing system 400 has stored thereon instructions, including video frame interpolation instructions 462, which may be executed by the processor 402 to implement a multi-frame video frame interpolation software system 700, including the various functional modules thereof, as further described with reference to FIG. 6 in the Multi-Frame Interpolation section below. The video frame interpolation instructions 462, in various embodiments, include one or more of flow estimation instructions 464, motion modeling instructions 466, optical flow refinement instructions 468, and/or post-refinement instructions 470. The flow estimation instructions 464, when executed by the processor 402, cause the computing system 400 to operate a flow estimation module 704 as further described in the Flow Estimation section below. The motion modeling instructions 466, when executed by the processor 402, cause the computing system 400 to operate a motion modeling module, such as a high-order motion modeling module 708, as further described with reference to FIGS. 7-9 in the High-Order Motion Modeling section below. The optical flow refinement instructions 468, when executed by the processor 402, cause the computing system 400 to operate an optical flow refinement module 712, as further described with reference to FIGS. 10-12 in the Optical Flow Refinement section below. The post-refinement instructions 470, when executed by the processor 402, cause the computing system 400 to operate a pixel refinement module 716, as further described with reference to FIGS. 13-14 in the Pixel Refinement section below.

The memory 426 also stores a variety of data 480. The data 480 may comprise video data 482 (i.e., data representative of a digital video), including data representative of a beginning frame of the video (hereinafter referred to as beginning frame 486) and data representative of a ending frame of the video (hereinafter referred to as ending frame 488). The beginning frame 486 and the ending frame 488 are a pair of consecutive frames of the video. Instructions, including the video frame interpretation instructions 462, the flow estimation instructions 464, the motion modelling instructions 466, the optical flow refinement instructions 468, and the post-refinement instructions 470, may be temporarily loaded into a volatile storage, such as RAM of the memory 426, which is used for storing runtime data variables and other types of data and/or information. Data received by the multi-frame video frame interpolation software system 700 implemented by the video frame interpolation instructions 462 may also be stored in the RAM of the memory 426. Although specific functions are described for various types of memory, this is merely one example, and a different assignment of functions to types of memory may also be used.

The computing system 400 may be a single device, for example a collection of circuits housed within a single housing. In other embodiments, the computing system 400 may be distributed across two or more devices or housings, possibly separated from each other in space. The communication bus 404 may comprise one or more communication links or networks.

Machine Learning

Machine Learning (ML) is an artificial intelligence technique in which algorithms are used to construct or build a "model" for a specific task from sample data that is capable of being applied to new input data to perform the specific task (i.e., making predictions or decisions based on new input data) without being explicitly programmed to perform the specific task.

As used herein, "model" shall refer to a machine learned model. A machine learned model refers to an executable computational structure, such as processor-executable software instructions, that can be executed. During training of the model, the parameters of the model are learned using sample data (e.g. data from a training dataset). Once the model has been trained, the trained model can be deployed and operated in an inference mode (e.g. applied to new input data) to perform the specific task (i.e. make predictions or decisions based on the new input data). The machine learned models described herein may be approximated by convolutional neural networks that have been trained to perform a task, specifically video frame interpolation. However, it will be appreciated that various embodiments of the systems, devices, and methods described herein may be equally applicable to other tasks described herein, other neural network architectures (such as fully connected or recurrent neural networks), and other machine learning techniques, including other deep learning techniques, with appropriate changes to certain operations. Furthermore, some of the embodiments of the software systems, computing systems, and methods described herein may have applications outside of the machine learning context.

Multi-Frame Interpolation—Overview

Example embodiments of software systems, computing systems, and methods for video frame interpolation, and in particular multi-frame video frame interpolation will now be described. Some embodiments of software systems and computing systems disclosed herein use one or more trained models to perform all or part of a video frame interpolation method, and in particular a multi-frame interpolation method.

Figure 5:
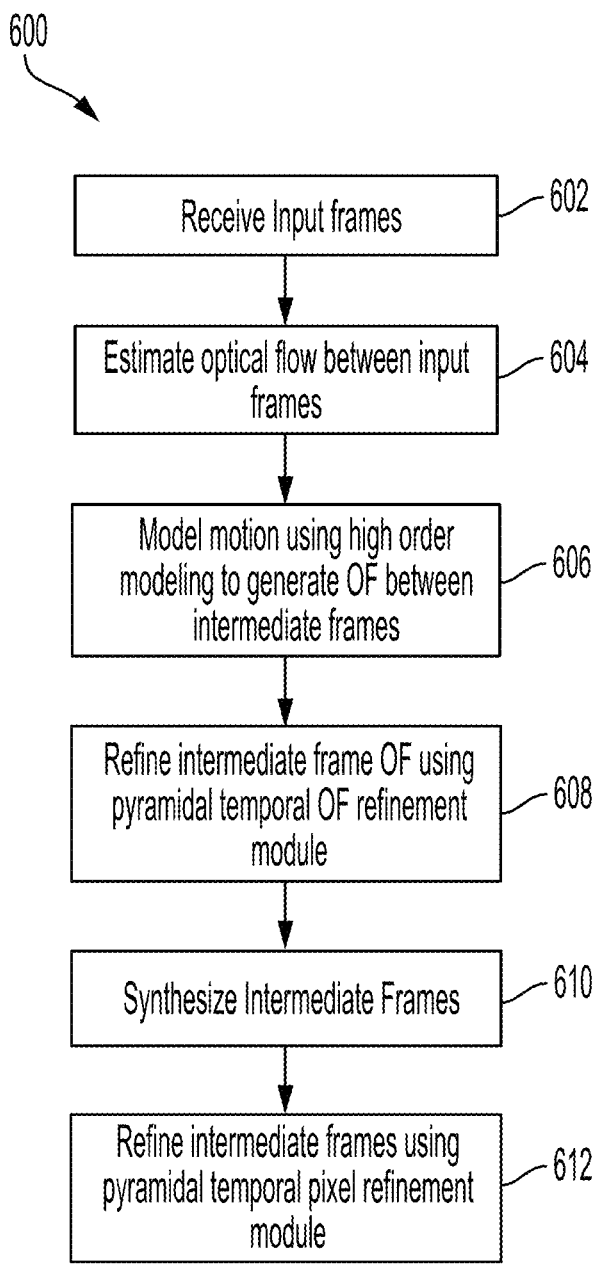
FIG. 5 is a high-level flowchart of an example method for performing multi-frame interpolation according to example embodiments described herein.
Figure 6:
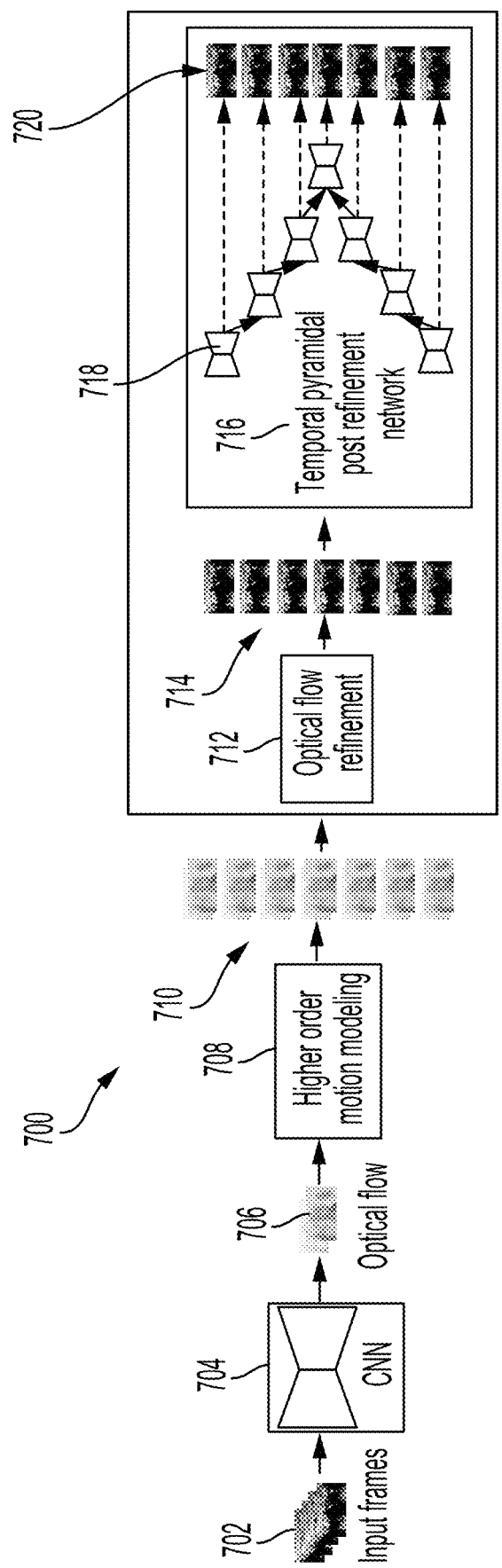
FIG. 6 is a block diagram of a multi-frame interpolation system according to example embodiments described herein.

FIG. 5 shows a high-level flowchart of a first method 600 for multi-frame interpolation performed by the multi-frame video frame interpolation software system 700 of FIG. 6 implemented by the video frame interpolation instructions 462. The multi-frame video frame interpolation software system 700 implemented by the video interpretation instructions 462 and the various sub-modules implemented by the instructions 464, 466, 468, and 470 may carry out the various steps (i.e. operations) of the method 600, as described in greater detail later in this section with reference to FIG. 6 and FIG. 15. At step 602, the frames of a video sequence of a video are received. The frames include the beginning frame $I_0$ 102 at t=0 and ending frame $I_1$ 104 at t=1. Optionally, two additional frames may be received: a prior frame at t=−1 (i.e. prior to the beginning frame 102) and a subsequent frame (i.e. subsequent to the ending frame 104) at t=2. The prior frame and subsequent frame may be used in performing high-order motion modelling of the estimated motion of objects across the two or four frames of the video sequence, as discussed with respect to FIG. 3B above.

At step 604, the optical flow estimation module 704 estimates optical flow between the beginning frame 102 and ending frame 104 and generates a pair of optical flow maps (i.e. a bidirectional optical flow map, comprising a forward unidirectional optical flow map representing motion forward from t=0 to t=1 and a backward unidirectional optical flow map representing motion backward from t=1 to t=0. The optical flow estimation module 704 comprises a convolutional neural network (CNN) as described in detail in the Flow Estimation section below. In described embodiments, optionally, a loss function used to train the CNN included in the optical flow estimation module 704 may relax the optical flow estimation constraints during training to enable the output of the optical flow estimation module 704 to grant the flexibility needed by the subsequent higher-order motion modeling performed at step 606.

At step 606, motion of objects (e.g. pixels) between $I_0$ 102 and $I_1$ 104 is estimated using a motion modeling module 708, for example the high order motion modeling module, and estimated intermediate optical flows 710 are generated between intermediate frames based on the estimated motion, as described in detail in the Motion Modeling section below. In some embodiments, cubic motion modeling may be used in place of conventional linear or quadratic motion modeling.

In the examples described herein, the number of intermediate frames is seven, designated as $I_{t1}$ through $I_{t7}$. It will be appreciated that an arbitrary number of intermediate frames can be generated using the multi-frame video frame interpolation methods described herein.

At step 608, the intermediate optical flow maps 710 are refined using pyramidal temporal optical flow refinement, as described in detail in the Optical Flow Refinement section below. Pyramidal temporal optical flow refinement focuses refinement attention on the intermediate optical flow maps 710 of the middle-most intermediate frames with the highest expected levels of error.

At step 610, the new intermediate frames are generated based on the refined intermediate optical flow maps generated at step 608.

At step 612, the generated intermediate frames are refined using pyramidal temporal pixel refinement. This step may be referred to herein as "pixel refinement" or "post refinement", referring to the fact that additional pixel-level refinement is performed on complete intermediate frames that could be used as the output of the method 600 without this post-refinement step 612.

It will be appreciated that some embodiments may omit some of these steps or substitute alternative implementations of various steps. The relaxation of optical flow estimation constraints at step 604 and the use of higher-order motion modeling at step 606 could be omitted in some embodiments, replaced with conventional optical flow estimation and linear or quadratic motion modeling. In some embodiments, the optical flow refinement step 608 could be omitted, or could be replaced with a non-pyramidal optical flow refinement step. In some embodiments, the pixel refinement step 612 could be omitted, or could be replaced with a non-pyramidal pixel refinement step. Each of these steps contributes to the final results achieved by the multi-frame video frame interpolation method 600 and can be used in the absence of one or more of the others.

FIG. 6 shows a high-level block diagram of a multi-frame video frame interpolation software system 700 that performs the method 600. Input frames 702, here shown as four frames having time indices of −1, 0, 1, and 2, are received by a convolutional neural network (CNN) of the optical flow estimation module 704. The input frames 702 at time index 0 is beginning frame 102; the input frames 702 at time index 1 is the ending frame 104; and the two frames at time indices −1 and 2 are additional frames used by the motion modeling module 708 for performing high-order motion modeling, as described in the High-Order Motion Modeling section below. The optical flow estimation module 704 carries out step 604 to generate the initial optical flow maps 706 between t=0 and t=1. A high-order motion modeling module 708 carries out step 606 to generate the motion of pixels based on the initial optical flow maps 706 using a cubic motion model. The high-order motion modeling module 708 generates a plurality of intermediate optical flow maps 710. The plurality of intermediate optical flow maps 710 are shown here as seven pairs of optical flow maps corresponding to the optical flow to and from each intermediate frame and its neighbors: i.e., the intermediate optical flow maps 710 include a first pair of intermediate optical flow maps estimating optical flow between first intermediate frame $I_{t1}$ and its neighbors (beginning frame $I_0$ 102 and second intermediate frame $I_{t2}$), and so on through a seventh pair of intermediate optical flow maps estimating optical flow between seventh intermediate frame $I_{t1}$ and its neighbors (sixth intermediate frame $I_{t6}$ and ending frame $I_0$ 104).

The intermediate optical flow maps 710 are refined by an optical flow refinement module 712, shown here as a pyramidal temporal optical flow refinement module, which carries out optical flow refinement step 608 as described in detail in the Optical Flow Refinement section below. The refined optical flow maps (not shown) generated by the optical flow refinement module 712 are used by a frame synthesis module (not shown) to carry out the frame synthesis step 610, generating intermediate frames 714 by applying the refined intermediate optical flow maps to the beginning frame 102 and ending frame 104 of the input frames 702. Once the intermediate frames 714 have been generated, they are further refined by a pixel refinement module 716, shown here as a temporal pyramidal pixel refinement module, carrying out the pixel refinement step 612 using a pyramidal configuration of pixel refinement sub-networks 718. In the embodiment shown here the pixel refinement sub-network 718 is a convolutional neural network. The output of the pixel refinement module 716 is a set of refined intermediate frames 720.

Figure 15:
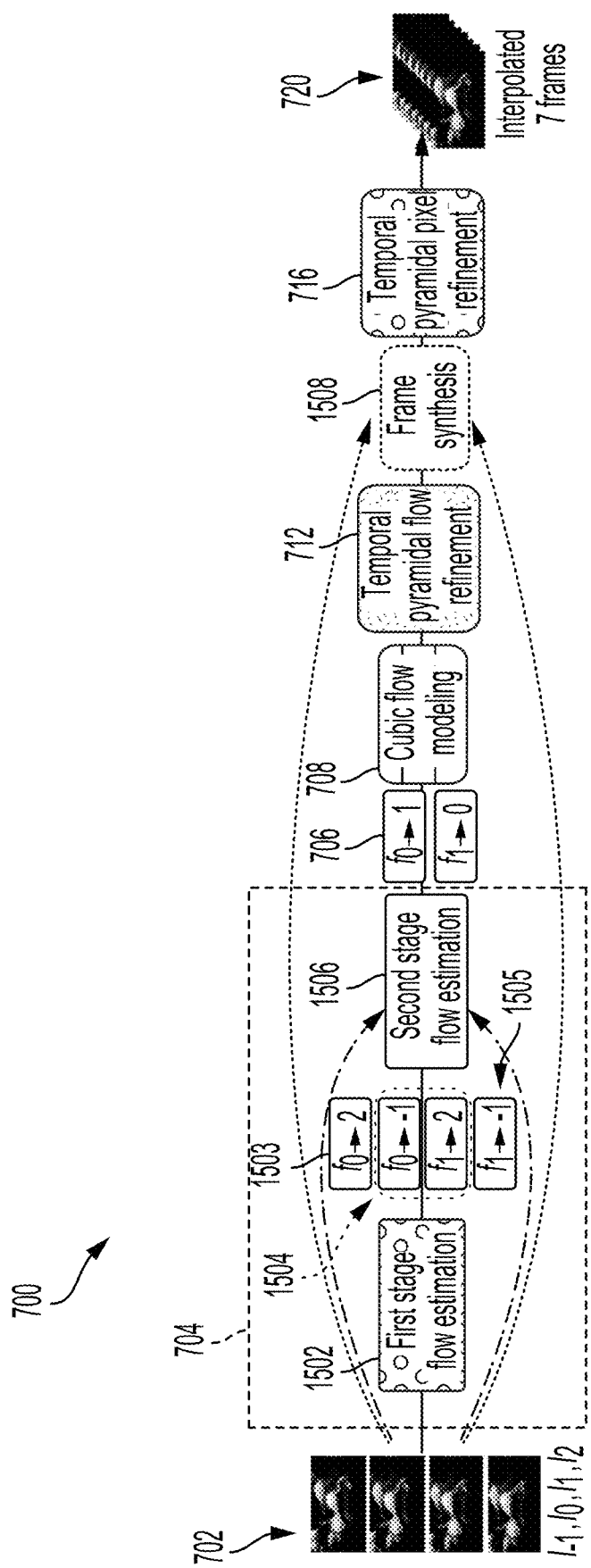
FIG. 15 is a further block diagram of a temporal pyramidal optical flow refinement module of a multi-frame video frame interpolation system according to example embodiments described herein.

FIG. 15 shows a further flowchart illustrating the steps (i.e. operations) performed by the multi-frame video frame interpolation software system 700, showing further details of the steps (i.e. operations) performed by the optical flow estimation module 704 and including a frame synthesis step 1508 following the steps (i.e. operations) performed by the optical flow refinement module 712. These details are described in the sections on Flow Estimation and Optical Flow Refinement below.

Flow Estimation

Existing techniques for flow estimation may not efficiently leverage neighbor frames (e.g. the prior frame at t=−1 and subsequent frame at t=2), and some are limited to one-directional optical flow estimation. In some embodiments, the optical flow estimation module 704 is a customized two-stage optical flow estimation module which is configured to perform two stages of optical flow estimation using neighbor frames (e.g. the prior frame at t=−1 and subsequent frame at t=2) to provide a better estimation of optical flow for a target pair of frames ($I_0$ and $I_1$), as shown in FIG. 15.

The optical flow estimation module 704 includes similar three-scale neural networks to perform the two stages 1502, 1506 of optical flow estimation, and neural networks used to perform each stage 1502, 1506 of optical flow estimation share the weights of two coarser levels, i.e., a first neural network used to perform first stage 1502 includes three levels of increasing refinement, a second neural network used to perform second stage 1506 includes three levels of increasing refinement, wherein the first level of the first neural network shares the weights of the first level of the second neural network, and the second level of the first neural network shares the weights of the second level of the second neural network. The first neural network used to perform the first stage 1502 of optical flow estimation is configured to receive two consecutive (e.g. sequential) frames and compute the bidirectional optical flow between the two consecutive (e.g. sequential) frames. Using this network performing the first stage, $f_{0 \to -1}$ and $f_{1 \to 2}$ are estimated using the corresponding frames (i.e. $f_{0 \to -1}$ using the prior frame at t=−1 and the beginning frame at t=0, and $f_{1 \to 2}$ using the ending frame at t=1 and the subsequent frame at t=2) as inputs, as shown at numeral 1504 in FIG. 15. These two optical flows 1504 are then used as initial estimates of $f_{0 \to 1}$ and $f_{1 \to 0}$ and combined with $I_0$ (the beginning frame) and $I_1$ (the ending frame), are passed to the finest level (i.e. the third level) of the second neural network used to perform the second stage 1506 to get the final estimates of $f_{0 \to 1}$ and $f_{1 \to 0}$. In parallel, the estimates of $f_{0 \to 2}$ 1503 and $f_{1 \to -1}$ 1505 are generated by the neural network at the first stage 1502, and are used by the high-order motion modeling module 708.

Existing optical flow estimation techniques generally try to map the pixel from the first frame to the exact location in the second frame. However, precise optical flow is not tailored for many computer vision tasks, including video frame interpolation. Specifically, existing optical flow estimation techniques lead to sub-optimal performance in occluded regions of the first and second frames. In other words, the optimum solution for optical flow as a step directed toward completion of a further task, such as video frame interpolation, does not necessarily lead to the optimal solution of the further task. Similarly, a strong constraint on optical flow estimation among input frames might degrade motion prediction and interpolation for the middle frames, especially for complex non-linear motion. In contrast, accepting some flexibility in estimating optical flow among input frames may provide flexibility in predicting the motion of objects between frames closer to non-linear motion patterns that can happen between two initial frames. This flexibility may provide certain advantages, as illustrated in the following example.

Figure 8:
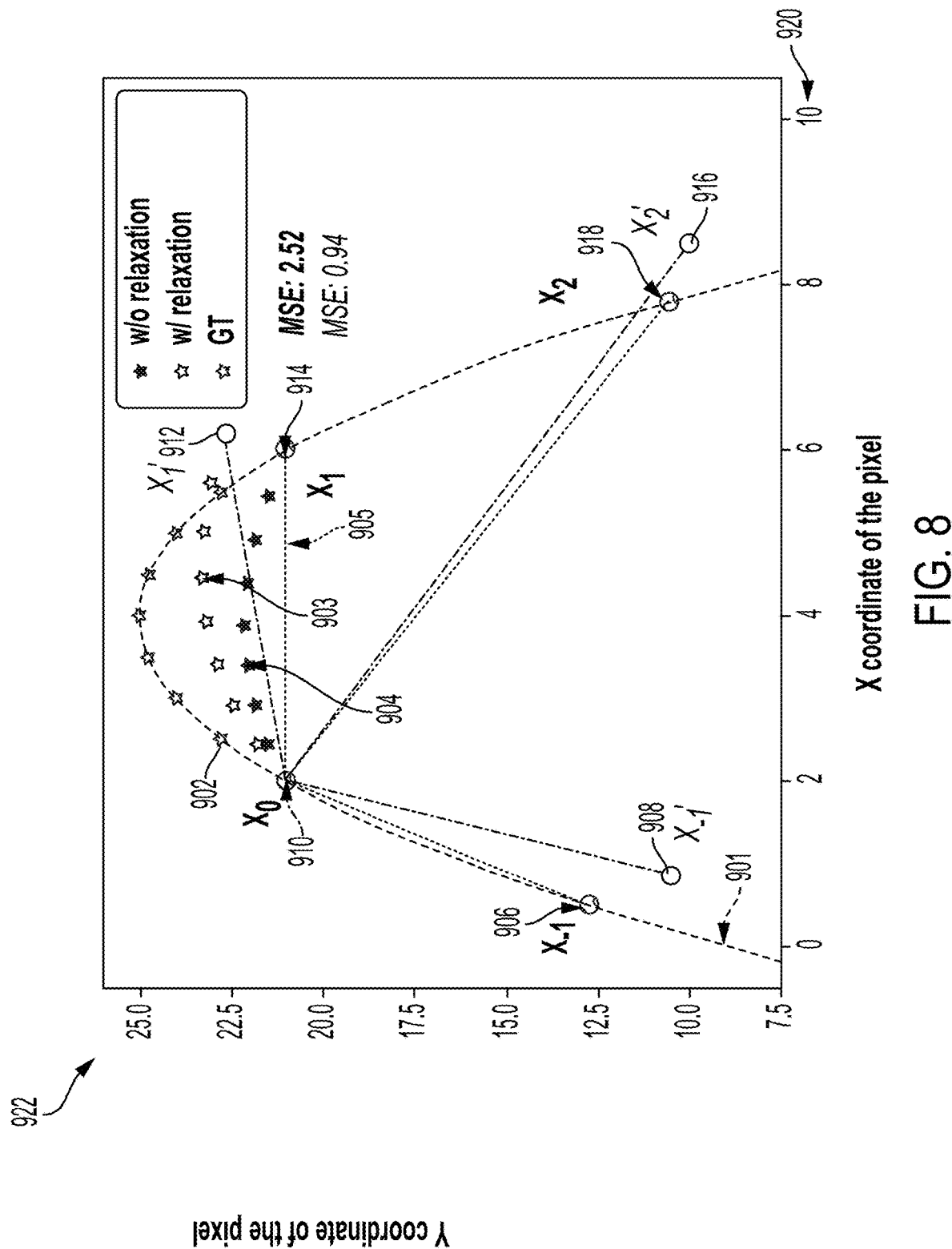
FIG. 8 a graph of the x and y coordinates of an object over multiple frames, showing actual motion compared to a linear motion model and a cubic motion model according to example embodiments described herein.

In FIG. 8, the results of using a cubic motion model to perform optical flow estimation according to example embodiments is shown. The dashed curve 901 is simulating the motion path for a pixel in the time spanned by four frames, and the x axis 920 and y axis 922 are the pixel coordinates in the frame. The pixel position is given in four consecutive frames as $X_{-1}$ 906, $X_0$ 910, $X_1$ 914, and $X_2$ 918. The aim is to find the seven locations of the pixel between $X_0$ 910 and $X_1$ 914 as indicated in the figures by the patterned stars 902 using $X_0$ 910 as a reference point. The straight lines 905 connecting the given positions represent the optical flow between $X_0$ 910 and other three points. Applying a cubic model, as described in (Equation 11) below in the High-Order Motion Modeling section, results in a predicted motion path shown by the solid stars 904.

Figure 9:
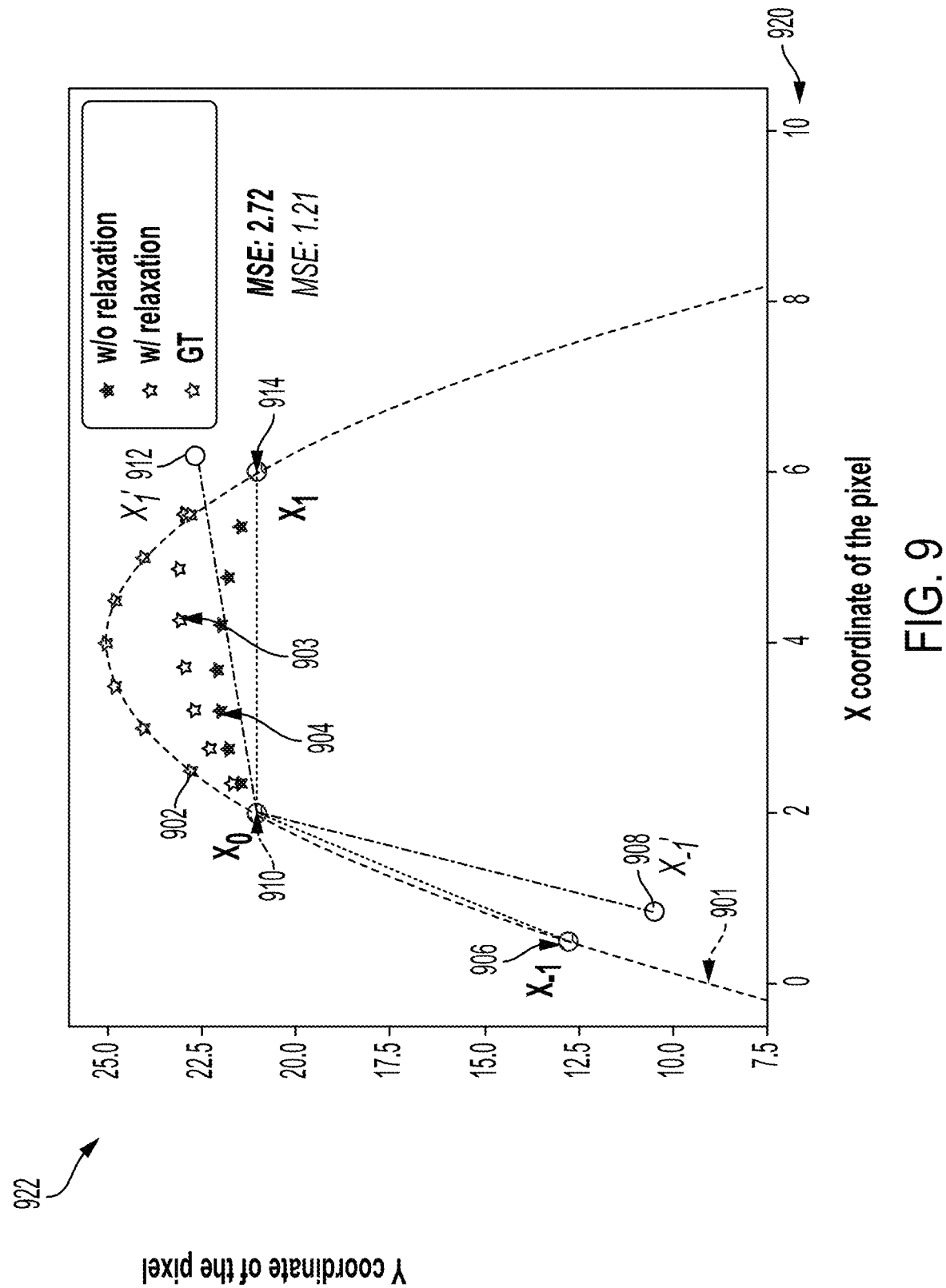
FIG. 9 a graph of the x and y coordinates of an object over multiple frames, showing actual motion compared to a linear motion model and a quadratic motion model.

The results of using a cubic motion model to perform optical flow estimation is shown in FIG. 8 may be compared to FIG. 9, which shows the results of using a quadratic motion model to perform optical flow estimation. The pixel position is given in three consecutive frames as $X_{-1}$ 906, $X_0$ 910, and $X_1$ 914. Using a quadratic motion model to perform optical flow estimation results in a predicted motion path shown by the solid stars 904.

As can be seen in FIGS. 8-9, the predicted locations 904 are far away from the ground truths (patterned stars 902). It can be observed that, instead of estimating pixel positions in intermediate interpolated frames to fit motion models by considering the ground truth location at a next frame ($X_1$ 914), giving the motion model flexibility to move to the neighbor location such as $X_1'$ 912 can significantly improve motion prediction for the intermediate locations. (Similarly, relaxation of flow estimation constraints as described below can permit the use of neighbor locations $X_{-1}'$ 908 instead of $X_{-1}$ 906 and $X_2'$ 916 instead of $X_2$ 918.) In FIGS. 8-9, by moving the solid stars 904 to the corresponding outlined stars 903, the mean squared error (MSE) of the predicted locations for the intermediate locations would be dramatically reduced. This flexibility may be imparted in some embodiments of the optical flow estimation module 704 by allowing the introduction of certain errors in the optical flow estimation process by relaxing the loss function for the flow estimation model used by the flow estimation module 704.

To apply the idea of relaxation of the loss function of the model used for optical flow estimation in the flow estimation module 704, some embodiments may use unsupervised learning, similar to the unsupervised learning used by Jiang, H., Sun, D., Jampani, V., Yang, M. H., Learned-Miller, E., and Kautz, J. in *Super slomo: High quality estimation of multiple intermediate frames for video interpolation*, Proceedings of the IEEE Conference on Computer Vision and Pattern Recognition, pp. 9000-9008 (2018), which is hereby incorporated by reference in its entirety. However, some embodiments may be trained using a relaxed warping loss function for optimizing the optical flow $f_{0 \to 1}$ as:

$$\mathcal{L}_{w\_relax}^{f_{0 \to 1}} = \sum_{i=1}^{h-1} \sum_{j=0}^{w-1} \| I_0^{w \to 1}(i, j) - I_1(i+m, j+n) \|_1, \quad \text{(Equation 4)}$$

$$\text{for } m, n \in [-d, +d],$$

where $I_0^{w \to 1}$ denotes $I_0$ warped by $f_{0 \to 1}$ to the ending frame $I_1$ used as a ground truth reference point, and d determines the range of neighborhood. The same loss function is applied to all the optical flows estimated by the neural networks included in the flow estimation module 704 during training.

In some embodiments, the flow estimation module 704 includes a neural network in which the input pair of frames $I_0$ (beginning frame 102) and $I_1$ (ending frame 104) is processed from low to high resolution, and the optical flow estimation obtained at each lower resolution is used by the next higher resolution estimation neural network. A more detailed view of the flow estimation module 704 is shown in FIG. 15. For better estimation of the optical flow in the target pairs ($I_0$ 102 and $I_1$ 104), a first stage 1502 of optical flow estimation performed by the flow estimation module 704 estimates prior and subsequent optical flows (OFs) $f_{0 \to -1}$ and $f_{1 \to 2}$ 1504 between $I_{-1}$ and $I_0$, and also between $I_1$ and $I_2$. These prior and subsequent optical flows 1504 are then used by the optical flow estimation module 704 when performing a second stage 1506 of optical flow estimation to guide the OF estimation between $I_0$ and $I_1$, and generate the initial optical flow maps 706, shown as a forward optical flow map and a backward optical flow map representing bidirectional optical flow.

To optimize the optical flow estimation performed by the optical flow estimation module 704, normally, each neural network estimates the optical flow such that each pixel in the beginning frame is mapped to the exact corresponding location in the ending frame. However, empirical results suggest that this constraint may not lead to the best estimation of pixel location for intermediate frames, especially in the case of non-linear motion. The example non-linear motion pattern shown in FIG. 3B may be used to illustrate the impact of flexible OF estimation (i.e. allowing a certain amount of error in OF estimation) in the accuracy of prediction of motion.

It can be observed that accepting some level of error during training of the neural networks included in the optical flow estimation module 704 allows the estimated OF to move away from the path defined by the solid points 326 and move toward the path defined by the patterned points 328 of prediction in the target interval (t=-2 to t=2), which are a better estimation of the actual curve 320 than the solid dots 326. Thus, to generate more accurate in-between motion prediction, the constraints on optical flow estimation are relaxed and some error is allowed for optical flow estimation during training of the neural networks included in the optical flow estimation module 704. Some embodiments use the following loss function may be used for training the neural networks of the optical flow estimation module 704:

$$\mathcal{L}_{of\_relax} = \sum_{i=1}^{h-1} \sum_{j=0}^{w-1} \min_{m,n \in [-d,+d]} \left( \| I_0^{warped}(i, j) - I_1(i+m, j+n) \|_1 \right) \quad \text{(Equation 5)}$$

where $I_0^{warped}(x, y) = I_0(x - \Delta u, y - \Delta v)$, and $(\Delta u, \Delta v)$ is the computed optical flow.

This relaxed loss function may be contrasted with a conventional optical flow estimation loss function, which computed end-to-end point error by comparing the predicted optical flow vector ($\Delta u$, $\Delta v$) at each pixel location with the ground truth optical flow vector by calculating a Euclidian distance between the two vectors. An example conventional loss function is therefore:

$$\mathcal{L} = \sum_{i=0}^{h-1} \sum_{j=0}^{w-1} \left( |I_0^{warped}(i,j) - I_1(i,j)| \right)$$

where $I_0^{warped}(x, y) = I_0(x-\Delta u, y-\Delta v)$, $I_1$ is the ground truth, and ($\Delta u$, $\Delta v$) is the computed optical flow.

In some embodiments, the updates to parameters of the neural network included in the optical flow module 704 that are used for optical flow estimation are computed using only the optical flow in the small neighborhood of four frames, which may make training the model more efficient.

High-Order Motion Modeling

In addition to the relaxed OF estimation described above, the approach taken to motion modeling has a significant impact on the accuracy of the prediction. Results of several different approaches to motion modeling are shown in FIG. 7.

Figure 7:
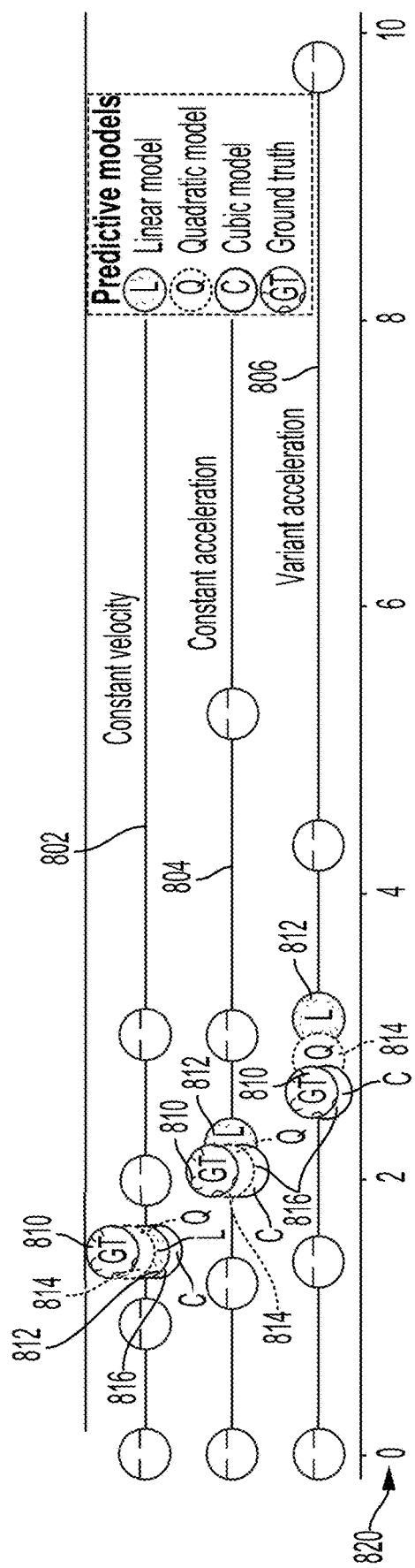
FIG. 7 is a graph of the performance of various motion models according to example embodiments described herein.

In FIG. 7, three different models used to perform motion modelling are graphed with their object position predictions 820 in three motion scenarios: constant velocity 802, constant acceleration 804, and variant acceleration 806. The object locations is given at four time stamps (t=0, t=1, t=2, and t=3), shown by the circles with vertical dashed cross-hatching, and the models are used to predict the object's position at t=1.5.

The linear motion scenario 802 corresponds to the line connecting points 322 in FIG. 3B: the linear model 812, quadratic motion model 814, and cubic model 816 all achieve a same prediction that aligns with the ground truth 810. However, the higher degree models 814, 816 produce a better fit with real situations that often include many non-linear motions: in the constant acceleration 804 scenario, the linear model 812 predicts a different object position 820 than the higher-order models 814, 816, and in the variable acceleration scenario 806, the linear model 812 predicts a different object position 820 than the quadratic model 814, which in turn predicts an even more divergent object position 820 than the cubic model 816.

Thus, use of a cubic motion model for motion modelling may be a more powerful motion modeling approach, capturing motions in real life scene were the objects are faced with variable face and acceleration. In some embodiments, the high-order motion modeling module 708 may use a cubic motion model based on the initial optical flow maps 706, described by the equation:

$$f_{0 \to t} = f_{0 \to 1} \times t + \frac{f_{3 \to 2} - f_{0 \to 1}}{2} \times (t^2 - t) + \frac{f_{0 \to 2} - 2 \times f_{0 \to 1} - (f_{1 \to 2} - f_{0 \to 1})}{6} \times (t^3 - t)) \quad \text{(Equation 6)}$$

where t is the time of the intermediate frame being generated, and $f_{t1 \to t2}$ is the optical flow between the input frames 702 at t=1 (ending frame $I_1$ 104) and t=2 (the subsequent frame following $I_1$ 104). This equation may be applied to the sequence of frames 702 to generate the intermediate optical flow maps 710.

The cubic motion model is capable of modeling motion of objects with varying acceleration. Considering the motion starting from time 0 to a middle time stamp $t_i$ as $f_{0 \to ti}$, we model this motion by the cubic model as:

$$f_{0 \to t_i} = u_0 \times t_i + \frac{a_0}{2} \times t_i^2 + \frac{\Delta a_0}{6} \times t_i^3, \quad \text{(Equation 7)}$$

where $v_0$, $a_0$ and $\Delta a_0$ are the velocity, acceleration, and acceleration change rate estimated at $I_0$ respectively. The acceleration terms can be computed as:

$$\Delta a_0 = a_1 - a_0,$$

$$a_0 = f_{0 \to 1} + f_{0 \to -1},$$

$$a_1 = f_{1 \to 2} + f_{1 \to 0}. \quad \text{(Equation 8)}$$

In the above equation, a0 and a1 are computed for pixels in frames $I_0$ and $I_1$ respectively. However, the acceleration change should be considered for the corresponding pixels between these two frames. Therefore, $a_i$ is reformulated to calculate $\Delta a_0$ based on pixel locations in frame $I_0$ as:

$$a_1 = f_{0 \to 2} - 2 \times f_{0 \to 1}. \quad \text{(Equation 9)}$$

Since $v_0$ is not constant when the acceleration is variable, the cubic motion equation above may be applied for t=1 to solve for $v_0$ using only the information computed above:

$$v_0 = f_{0 \to 1} - \frac{a_0}{2} - \frac{a_1 - a_0}{6}. \quad \text{(Equation 10)}$$

Finally, $f_{0 \to ti}$ for any $t \in [0,1]$ can be expressed based on only the optical flow between the two frames by:

$$f_{0 \to t_i} = f_{0 \to 1} \times t_i + \frac{a_0}{2} \times (t_i^2 - t_i) + \frac{a_1 - a_0}{6} \times (t_i^3 - t_i). \quad \text{(Equation 11)}$$

$f_{0 \to ti}$ can be computed in the same manner.

Optical Flow Refinement

To make use of the similarity between multiple frames in assisting interpolation, and to also take into account the pattern of escalating error in the middle-most frames, some embodiments may use adaptive joint processing as part of the optical flow refinement module 712 and/or the pixel refinement module 716. One or both refinement modules 712, 716 may use a pyramidal model for successive refinement of the most error-prone interpolated frames.

In the optical flow refinement module 712, bidirectional optical flow maps $f_{0 \to ti}$ and $f_{1 \to ti}$ predicted by (Equation 11) above are based on the optical flow maps computed among the input frames 702. The initial optical flow predictions may inherit errors from optical flow estimation and cubic motion modeling, notably at motion boundaries. To improve optical flows maps $f_{0 \to ti}$ and $f_{1 \to ti}$, the optical flow refinement module 712 considers the relationship among intermediate frames and processes all of the intermediate frames in one forward pass.

Figure 10:
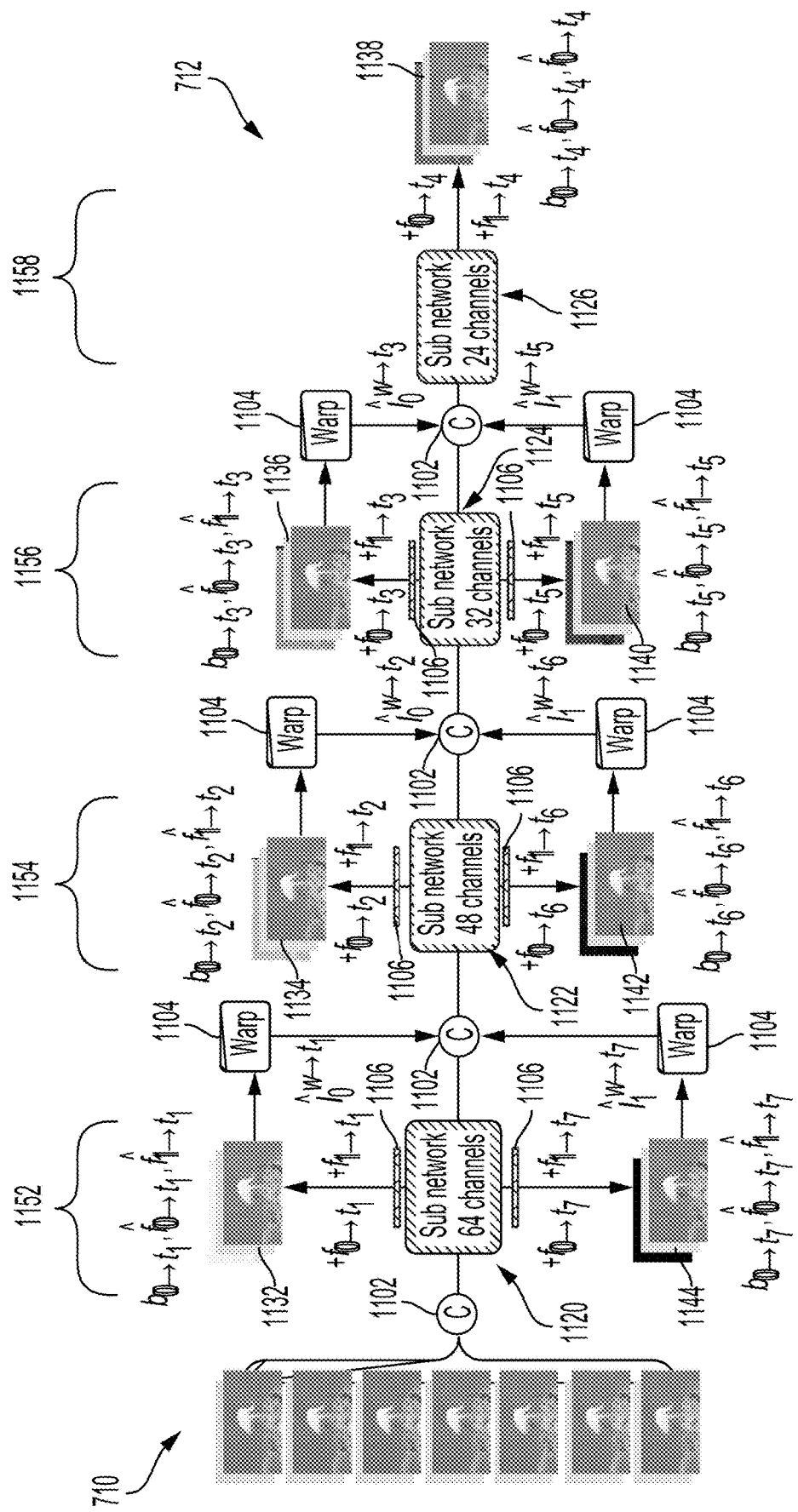
FIG. 10 is a block diagram of a temporal pyramidal optical flow refinement module of a multi-frame interpolation system according to example embodiments described herein.

To this end, the optical flow refinement module 712 includes a temporal pyramidal optical flow refinement module, which is used to enforce a strong bond between the intermediate frames, as shown in FIG. 10.

FIG. 10 shows an embodiment in which multi-frame interpolation is performed step by step from easy to difficult using a single convolutional neural network. The single CNN receives the concatenation of seven pairs of initial predicted optical flows (bidirectional intermediate optical flow maps 710) and adaptively refines the optical flow maps based on the expected quality of the interpolated intermediate frames. The intermediate frames (here, $I_{t1}$ and $I_{t7}$) closest to the initial two frames ($I_0$ 102 and $I_1$ 104) are more likely to achieve higher quality interpolation results, so they are processed only by the first level 1152 in the pyramid while the other frames are processed by more levels 1154, 1156, and/or 1158 based on their distance to the initial frames $I_0$ 102 and $I_1$ 104. The optical flow for the middle frame 106, $I_{t4}$ in this case, is processed by all the levels 1152,1154,1156,1158 in this architecture, as it is expected to achieve the lowest quality interpolation. To fully utilize the refined optical flow maps at each level 1152,1154,1156,1158 of the optical flow refinement module 712, frames are warped by the obtained optical flow at each level as $I_0^{w \to ti}$ and $I_1^{w \to ti}$ and fed to the next level. This warping and feeding forward helps to achieve better results in the next level, as the warped frames are one step closer in the time domain toward the locations in the target frame of that layer compared to $I_0$ and $I_1$. Thus, the motion between $I_0$ and $I_1$ is composed of piece-wise linear motions, each measured within a short temporal interval.

In the proposed single CNN, at each level, in addition to the optical flow, a blending mask $b_{ti}$ is also generated. Therefore, the intermediate frames can be generated (e.g. synthesized) as:

$$I_{ts} = b_{ti} \odot g(I_0, \hat{f}_{0 \to ti}) + (1 - b_{ti}) \odot g(I_1, \hat{f}_{1 \to ti}),$$ (Equation 12)

where $\hat{f}_{0 \to ti}$ band $\hat{f}_{1 \to ti}$ are the refined bidirectional optical flow maps at $t_i$, $\odot$ denotes element-wise multiplication, and g(•,•) is the bilinear warping function as described by Liu, Z., Yeh, R. A., Tang, X., Liu, Y., and Agarwala, A. in *Video frame synthesis using deep voxel flow*, Proceedings of the IEEE International Conference on Computer Vision, pp. 4463{4471 (2017), which is hereby incorporated by reference in its entirety.

In operation, the intermediate optical flow maps 710 are passed to the optical flow refinement module 712. As shown in FIG. 10, the optical flow refinement module 712 has a neural network with a pyramidal structure that adaptively refines the intermediate optical flow maps 710 based on the expected quality of the intermediate frames as a function of their temporal distance to beginning frame 102 and ending frame 104. By using an optical flow refinement module with pyramidal flow refinement and an optical flow estimation module with complex motion modeling, the estimated flow of the intermediate frames is refined in a pyramidal processing operation while considering a high (e.g. cubic) degree of motion model to better handle non-linear motion patterns. The pyramidal structure of the optical flow refinement module 712 provides a strong connection among interpolated intermediate frames to enforce temporal consistency.

As described above with respect to FIG. 3A, the frames closest to beginning frame 102 and ending frame 104, $I_{t1}$ and $I_{t7}$, are more likely to have higher quality. Thus, $I_{t1}$ and $I_{t7}$ are processed in a first level 1152 of the pyramid, while the other frames are processed by more processing steps in the pyramid based on their distance from the starting 102 and ending 104 frames. In this approach, the middle frame of seven generated frames ($I_{t4}$) is processed by all levels 1152,1154,1156,1158 of the pyramid, as it is expected to have the lowest quality level in interpolation. In addition, the warped frames produced by the warping operations 1104 are fed to the next level for fusion, as the pixels are moved one time step closer towards the locations in the middle frame.

Beginning at the left side of the optical flow refinement module 712 shown in FIG. 10, the intermediate optical flow maps 710 undergo a concatenation operation 1102 before being fed to the first level 1152 of the pyramidal structure comprising a first sub-network network 1120 of a optical flow refinement neural network, shown here as a 64-channel sub-network of a convolutional neural network. An optical flow map for $I_{t1}$ 1132 and $I_{t7}$ 1144 are each generated by a convolution block with a leaky relu function 1106. These optical flow maps 1132, 1144 are each warped by a warping function 1104 to generate warped first intermediate frame $I_0^{w \to t1}$ and warped seventh intermediate frame $I_0^{w \to t7}$ respectively. These warped frames are concatenated to the feature map output of the first sub-network 1120 by a concatenation operation 1102.

This process repeats at the second level 1154, which includes a 48-channel second sub-network sub-network 1122 and generates optical flow maps for for $I_{t2}$ 1134 and $I_{t6}$ 1142, similarly feeding the warped second and sixth intermediate frames back to the feature map output of the second sub-network 1122.

This process repeats at the third level 1156, which includes a 32-channel third sub-network 1124 and generates optical flow maps for for $I_{t3}$ 1136 and $I_{t5}$ 1140, similarly feeding the warped second and sixth intermediate frames back to the feature map output of the third sub-network 1124.

The fourth level 1158 is a 24-channel fourth sub-network 1126, which generates as its output the optical flow map for the middle frame $I_{t4}$ 1138.

Figure 11:
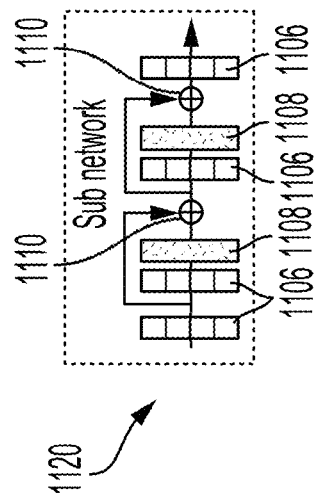
FIG. 11 is a block diagram of a sub-network of the temporal pyramidal optical flow refinement module of FIG. 9A.

FIG. 11 shows a sub-network structure of each sub-network 1120,1122,1124,1126. Sub-network 1120 is shown as a linear sequence of two convolution blocks with a leaky relu function 1106, a single convolution block 1108, an addition operation 1110, a second repetition of 1106, 1108, and 1110, and a final convolution block with a leaky relu function 1106. A first side channel passes the output from the first convolution block with a leaky relu function 1106 to the first addition operation 1110, and a second side channel passes the output from the first addition operation 1110 to the second addition operation 1110.

Figure 12:
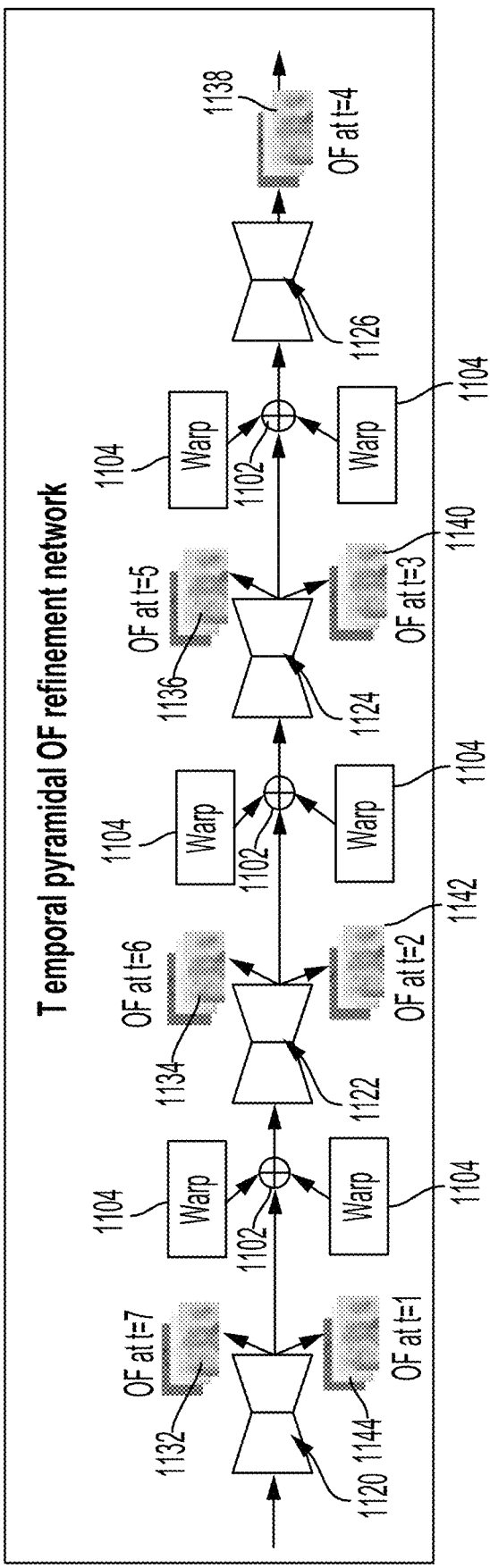
FIG. 12 is a simplified block diagram of the temporal pyramidal optical flow refinement module of FIG. 10.

FIG. 12 shows a further, simplified illustration of the operation of the temporal pyramidal optical flow refinement module 712.

As shown in FIG. 15, a frame synthesis step (i.e. operation) 1508 generates (e.g. synthesizes) a set of intermediate frames 714 based on the refined intermediate optical flow maps generated by the optical flow refinement module 712. In some embodiments, the frame synthesis step (i.e. operation) 1508 is performed by the optical flow refinement module 712. The frame synthesis step (i.e. operation) 1508 may use warping, blending, and/or other frame synthesis techniques to synthesize the intermediate frames based on the refined intermediate frames and the beginning frame 102 and ending frame 104 of the input frames 702. In some embodiments, the warped frames generated by the warping operations 1104 of the optical flow refinement module 712 are used as the intermediate frames 714.

Pixel Refinement

In some embodiments, a pixel refinement module 716 refines the generated intermediate frames 714 based on information obtained from the sequence of frames 702, using a pyramidal processing structure to process all intermediate frames 714 in one forward pass and improve consistency in time. The intermediate frames 714 may still contain artifacts due to inaccurate optical flow or blending masks.

Figure 13:
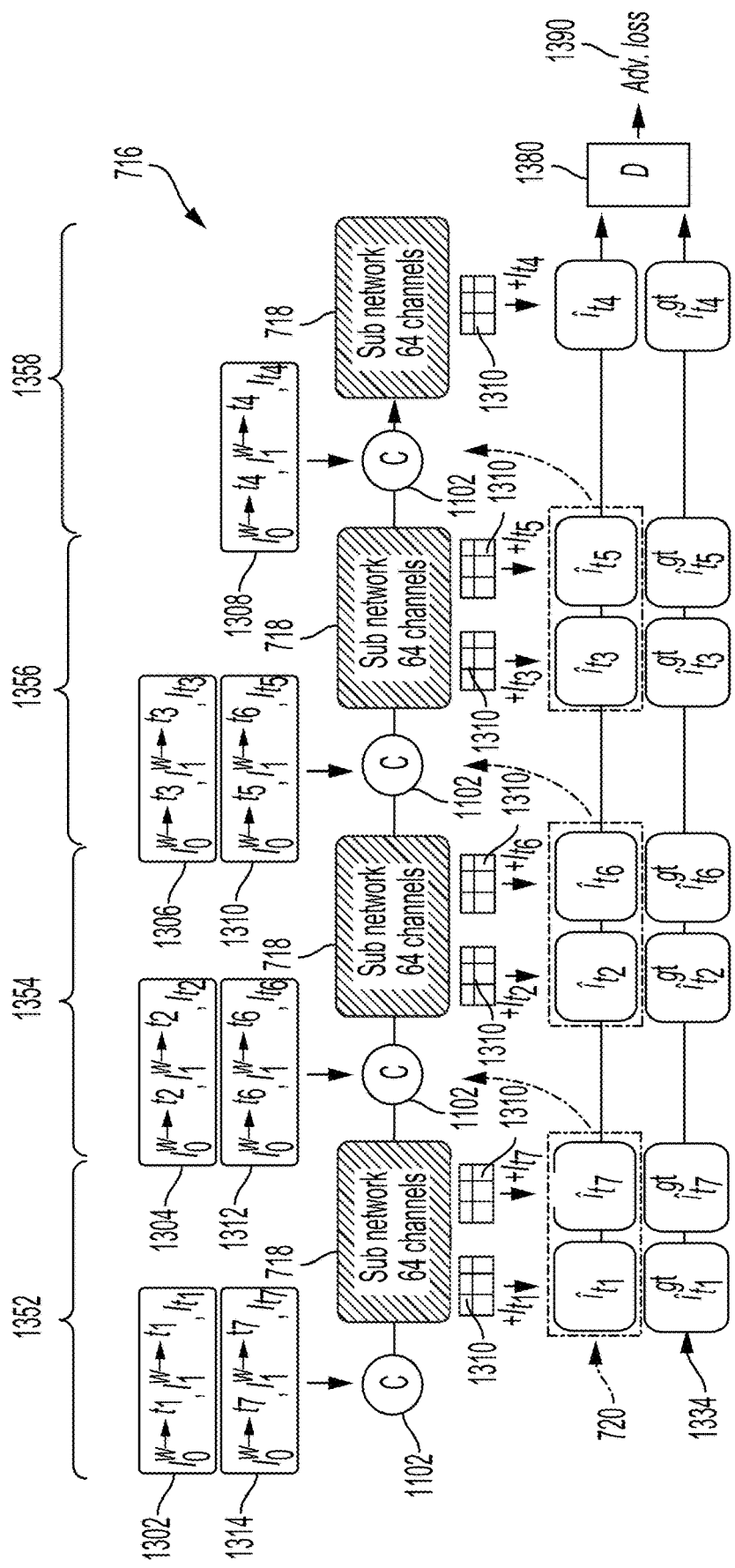
FIG. 13 is a block diagram of a temporal pyramidal pixel refinement module of a multi-frame interpolation system according to example embodiments described herein.

As shown in FIG. 13, the pixel refinement module 716 adaptively refines the generated intermediate frames 714 using a temporal pyramidal structure similar to that of the optical flow refinement module 712. However, as the generated intermediate frames 714 are not aligned, feeding all the generated intermediate frames 714 to the pixel refinement module 716 at its first level 1352 may not properly enhance the quality of the generated intermediate frames. Instead, individual generated intermediate frames 714 are provided separately at different levels of the convolutional neural network according to their temporal distance: $I_{t1}$ and $I_{t7}$ are provided to the first level 1352; $I_{t2}$ and $I_{t6}$ are provided to the second level 1354; $I_{t3}$ and $I_{t5}$ are provided to the third level 1356; and $I_{t4}$ is provided to the fourth level 1358. At each time stamp $t_i$, the warped inputs $I_0^{w \to ti}$ and $I_1^{w \to ti}$ generated by the warping operations 1104 of the optical flow refinement module 712 are also fed to each level to reduce the error caused by inaccurate blending masks. Similar to the optical flow refinement module 712, the refined intermediate frames $\hat{I}_{ti}$ are also fed to the next level to assist with refinement of the generated intermediate frames 714 that are closer to the middle time stamp.

As shown in FIG. 13, the same pixel refinement sub-network 718 is used for each level of the pyramid. The pixel refinement sub-network 718 is composed of two residual blocks, with one convolutional block at the input and another convolution block at the output. The residual blocks may be as described by Nah, S., Hyun Kim, T., and Mu Lee, K. in *Deep multi-scale convolutional neural network for dynamic scene deblurring*, Proceedings of the IEEE Conference on Computer Vision and Pattern Recognition, pp. 3883-3891 (2017), which is hereby incorporated by reference in its entirety.

For both temporal pyramidal refinement modules 712, 716, residual learning may be used to learn the optical flow and frame residuals. In the optical flow refinement module 712, the number of channels may be set in decreasing order (e.g. 64, 48, 32, and 24 channels as shown in FIG. 10), as fewer frames are dealt with when moving to the middle time step. In contrast, the same number of channels are used for all the level of the pixel refinement module 716 in the illustrated embodiment.

In operation, the optical flows generated by the optical flow refinement module 712 are used to warp the initial images (beginning frame 102 and ending frame 104 of the input frames 702) and create the intermediate frames 714. The intermediate frames 714 are then passed to the pixel refinement module 716 to refine at the pixel level with another pyramidal processing structure and generate the final refined intermediate frames 720 as outputs. FIG. 13 shows the architecture of an example pixel refinement module 716. Due to the motion shift among the intermediate frames 714 and the use of a rich RGB color space, inputting all seven candidate intermediate frames 714 at the first level 1352 may not provide optimal pixel refinement. The earlier levels (e.g. 1352 and 1354) may not have large receptive fields to cover all the motion ranges, and the rich image content of seven frames may confuse the early levels; it is easier to accurately refine the frames closer to the beginning frame 102 or ending frame 104. Therefore, in contrast to the optical flow refinement module 712, the pixel refinement module 716 receives intermediate frame 714 inputs at different levels of the neural network according to the distance of the intermediate frame 714 from the beginning frame 102 an ending frame 104 and its proximity to the middle time step ($t_4$ in this case). To achieve information sharing, the feature maps from earlier levels are passed to the later levels.

At the first level 1352, a concatenation operation 1102 receives input data relating to the two intermediate frames $I_{t1}$ and $I_{t7}$: first intermediate frame input data 1302 consisting of $[I_0^{w \to t1}, I_1^{w \to t1}, \text{ and } I_{t1}]$, and seventh intermediate frame input data 1314 consisting of $[I_0^{w \to t7}, I_1^{w \to t7}, \text{ and } I_{t7}]$. These inputs 1302, 1314 are concatenated and fed to a first pixel refinement sub-network 718, shown here as a 64-channel sub-network of a pixel refinement convolutional neural network. The first pixel refinement sub-network 718 generates as outputs, via convolution blocks with leaky relu functions 1310, refined frames 720 corresponding to its input intermediate frames 714: a first refined intermediate frame $\hat{I}_{t1}$ and seventh refined intermediate frame $\hat{I}_{t7}$.

The second level 1354 uses a concatenation operation 1102 to concatenate together the feature map output of the first pixel refinement sub-network 718 with its inputs, second intermediate frame input data 1304 and sixth intermediate frame input data 1312, producing further corresponding refined frames 720: second refined intermediate frame $\hat{I}_{t2}$ and sixth refined intermediate frame $\hat{I}_{t6}$.

The third level 1356 repeats the same process as the second level 1354, with inputs third intermediate frame input data 1306 and fifth intermediate frame input data 1310, and refined frame 720 outputs third refined intermediate frame $\hat{I}_{t3}$ and fifth refined intermediate frame $\hat{I}_{t5}$.

The fourth level 1358 repeats the same process, but using only a single input, fourth intermediate frame input data 1308, and producing a single refined frame 720 output, fourth refined intermediate frame $\hat{I}_{t4}$.

Training and Loss Functions

Figure 14:
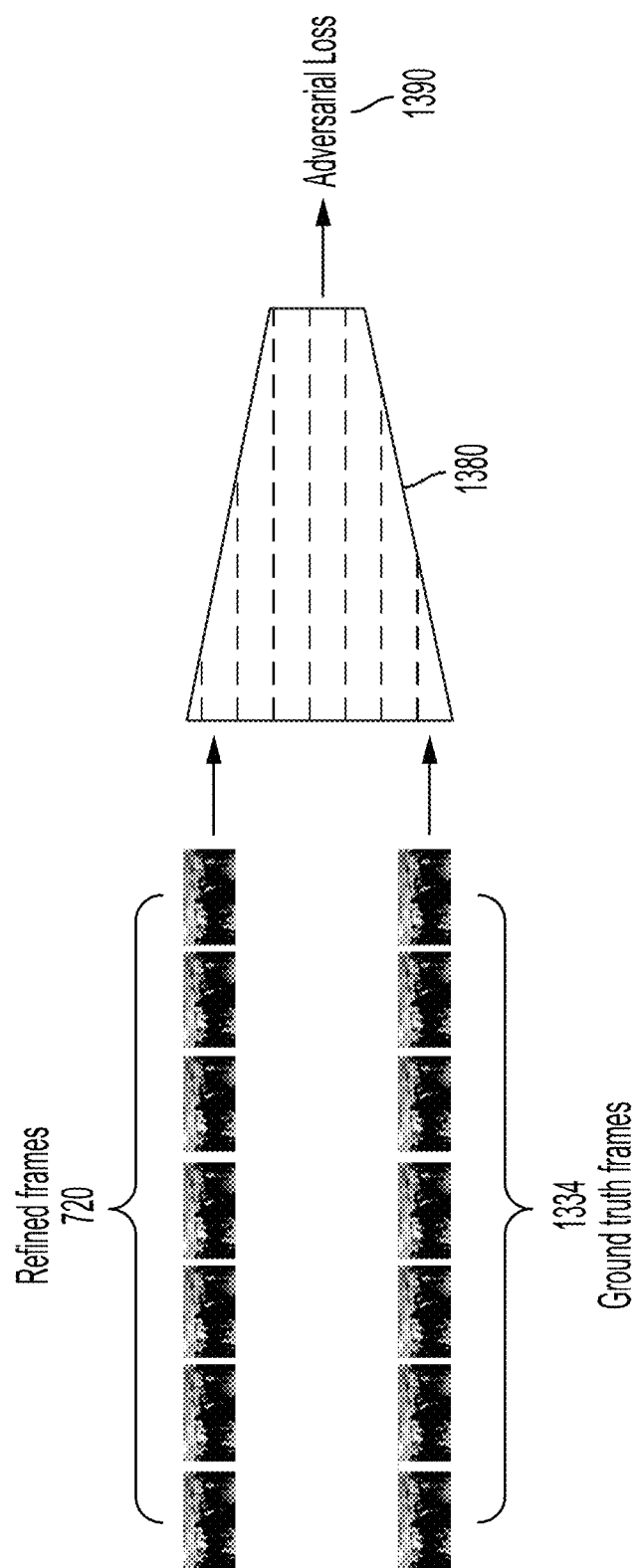
FIG. 14 is a block diagram of a generative adversarial network used when training a multi-frame video frame interpolation system according to example embodiments described herein.

FIGS. 13 and 14 also show the basic structure of an adversarial learning scheme used to train all or some models (e.g. neural networks) included in the multi-frame interpolation system 700. During training, input frames 702 from a training video sequence are provided as input to the multi-frame interpolation system 700, including a non-consecutive beginning frame 102 and ending frame 104 having located temporally between them, in the training video sequence, a plurality of actual (ground truth) intermediate frames 1334. The refined frames 720 generated by the pixel refinement module 716 based on the input frames 702, along with the set of ground truth frames 1334 taken from the training video sequence, are used to calculate an adversarial loss 1390 using a discriminator network 1380 of a temporal consistency generative adversarial network (GAN). The multi-frame interpolation system 700 may in some embodiments constitute a single pyramidal neural network, progressively guiding the frame generation process at higher level of the single pyramidal network. By jointly optimizing all intermediate frames, temporal consistency can be exploited. A generative adversarial learning scheme may further be used to impose consistency among the interpolated frames, as described by Zhang, H., Shen, C., Li, Y., Cao, Y., Liu, Y., and Yan, Y. in *Exploiting temporal consistency for real-time video depth estimation*, Proceedings of the IEEE International Conference on Computer Vision, pp. 1725-1734 (2019), which is hereby incorporated by reference in its entirety. The idea of a two-player min-max game may be used to train the discriminator network D, as described by Goodfellow, I., Pouget-Abadie, J., Mirza, M., Xu, B., Warde-Farley, D., Ozair, S., Courville, A., and Bengio, Y. in *Generative adversarial nets*, Advances in neural information processing systems, pp. 2672-2680 (2014), which is hereby incorporated by reference in its entirety. The GAN (i.e. the parameter of the generator), may thereby optimize the following problem:

$$\min_G \max_D \mathbb{E}_{g \sim p(I_{t_i}^{g_t})}[\log D(g)] + \mathbb{E}_{x \sim p(I)}[\log(1 - D(G(x)))],$$ (Equation 13)

where $g=[I_{t1}^{gt}, \ldots, I_{t7}^{gt}]$ are the seven ground truth frames and $x=[I_{-1}, I_0, I_1, I_2]$ are the four input frames. The input to the discriminator 1380 is the concatenation of the seven refined intermediate frames 720 generated by a neural network of the pixel refinement module 716 of the multi-frame interpolation system 700, which serves as a generator of the GAN. The following generative component of the GAN is added as the temporal loss:

$$\mathcal{L}_{temp} = \sum_{n=1}^{N} -\log D(G(x)).$$ (Equation 14)

To optimize the optical flow refinement module 712 and pixel refinement module 716, the $\ell$ loss is applied. The whole multi-frame interpolation system 700 is trained by combining all the loss functions:

$$\mathcal{L} = \sum_{i=1}^{7} (\|\hat{I}_{t_i} - I_{t_i}^{gt}\|_1 + \|I_{t_i} - I_{t_i}^{gt}\|_1) \mathcal{L}_{w_{relax}} + \lambda \mathcal{L}_{temp},$$ (Equation 15)

where $\lambda$ is the weighting coefficient, and equals 0.001.

An example of training of the models (or neural networks) included in the multi-frame interpolation system 710 is now described. To train the neural networks included in the multi-frame interpolation system 700, a training dataset of 240 fps video clips with resolution of 720×1280 pixels is assembled. In order to cover various types of scenes, 903 short videos are chosen with lengths between 2 and 10 seconds. From these videos, 8463 samples are created, each sample consisting of 25 consecutive frames. Each sample is used as a batch of training data and thus each batch includes 25 consecutive frames of the sample. The multi-frame interpolation system 700 receives the $1^{st}$, $9^{th}$, $17^{th}$, and $25^{th}$ frames as inputs and generates seven frames between the $9^{th}$ and $17^{th}$ frames by considering the $10^{th}$ to $16^{th}$ frames as their ground truth. Randomly-altered versions of the samples are also used for data augmentation in training: patches of 352×325 pixels are randomly cropped from the frames of the samples, and horizontal, vertical and temporal flipping is applied.

To improve convergence speed, stage-wise training of the neural networks included in the multi-frame video frame interpolation software system 700 is performed. First, each neural network except the discriminator network is trained using $\ell$ loss independently for 15 epochs with a learning rate of $10^{-4}$ by not updating the parameters other networks. The neural networks included in the multi-frame video frame interpolation software system 700 are then jointly trained using Equation (15) above and a learning rate of $10^{-5}$ for 100 epochs. An Adam optimizer is used (as described by Kingma, D. P. and Ba, J. in *Adam: A method for stochastic optimization*. arXiv preprint, arXiv:1412.6980 (2014) and the neighborhood range d in Equation (4) is set to 9. During training of the neural networks included in the multi-frame video frame interpolation software system 700, the pixel values of all images are scaled to the range [−1, 1]. The training may be conducted on an Nvidia P100 GPU.

Other Applications

The multi-frame interpolation system 700 has been described with respect to applications in the area of slow-motion video generation. However, some embodiments described herein can be used for a wide range of applications such as video in-painting, video object removal, and high-resolution 3D reconstruction of objects from video footage. The general temporal pyramidal structure described in the context of the optical flow refinement module 712 and pixel refinement module 716 may be used for a range of sequence processing and interpolation tasks wherein the quality of the output data produced by the task close to the given input data provided to the task is more accurate than output data far from the input data. The input data can be temporal sequences or any other sequence: e.g., business analytics data, curve super-resolution, or high-resolution construction and analysis.

The motion modeling methods described in the context of the high-order motion modeling module 708 can be used in some embodiments to improve the performance of motion estimation and synthesis in, e.g., computer vision and computer graphics. One example application is motion capturing with limited resolution in time, using high-order motion modeling to generate very high resolution video frames with fine details of motions.

It will be appreciated that the methods, devices, systems, and media described herein lend themselves to additional practical applications as well.

Methods and Processor Readable Media

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer either to a body of data, a relational database management system (RDBMS), or to both. As used herein, a database may comprise any collection of data comprising hierarchical databases, relational databases, flat file databases, object-relational databases, object-oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is therefore described by the appended claims rather than by the foregoing description. The scope of the claims should not be limited by the embodiments set forth in the examples, but should be given the broadest interpretation consistent with the description as a whole.

Further details of example embodiments, along with experimental results, comparison to other techniques, identification of data used to train and test embodiments, and further references relied upon are set out in the following paper entitled "Temporally Adaptive Multi Frame Interpolation with High Cubic Motion Modeling", which is to be considered part of this Detailed Description. All external references cited in the paper are hereby incorporated by reference in their entirety.

The invention claimed is:

1. A method for multi-frame video frame interpolation, the method comprising:
 obtaining a plurality of optical flow maps corresponding to a plurality of times between a beginning time and an ending time;
 processing the plurality of optical flow maps to generate a first refined optical flow map corresponding to a first intermediate time proximal to the beginning time or ending time;
 processing the plurality of optical flow maps and the first refined intermediate optical flow map to generate a second refined optical flow map corresponding to a second intermediate time distal from both the beginning time and ending time;
 generating a first new intermediate frame based on the first refined optical flow map; and
 generating a second new intermediate frame based on the second refined optical flow map.

2. The method of claim 1, further comprising:
 receiving a video sequence of a video, comprising:
  a beginning frame of the video sequence, the beginning frame corresponding to a beginning time of the video sequence; and
  an ending frame of the video sequence, the ending frame corresponding to an ending time of the video sequence;
 receiving two additional frames of the video corresponding to two additional times, each additional time being either before the beginning time or after the ending time of the video sequence;
 generating at least one initial optical flow map corresponding to estimated optical flow between the beginning frame and the ending frame; and
 processing the at least one initial optical flow map to generate the plurality of intermediate optical flow maps, the plurality of intermediate optical flow maps corresponding to a plurality of intermediate times between the beginning time and ending time of the video sequence, by applying a motion model to the at least one initial optical flow map.

3. The method of claim 2, wherein the motion model is cubic or higher in order.

4. The method of claim 1, further comprising:
 processing the plurality of optical flow map to generate at least one additional refined optical flow map, wherein the first refined optical flow map, the second refined optical flow map, and the at least one additional refined optical flow map constitute a plurality of refined optical flow maps corresponding to the plurality of times; and
 generating at least one additional new intermediate frame based on the at least one additional refined optical flow map, wherein the first new intermediate frame, the second new intermediate frame, and the at least one additional new intermediate frame constitute a plurality of new intermediate frames corresponding to the plurality of times.

5. The method of claim 4, wherein the at least one additional refined optical flow map is generated using a pixel refinement model that is trained using an adversarial loss function generated by a generative adversarial network.

6. The method of claim 4, further comprising:
 obtaining the plurality of new intermediate frames; and
 refining the first new intermediate frame and the second new intermediate frame by:
  generating a first refined frame corresponding to a first time proximal to the beginning time or ending time, based on the plurality of new intermediate frames; and
  generating a second refined frame corresponding to a second time distal from both the beginning time and ending time, based on the plurality of new intermediate frames and the first refined frame.

7. The method of claim 6, further comprising refining the plurality of new intermediate frames to generate a plurality of refined new intermediate frames based on the plurality of new intermediate frames.

8. The method of claim 1, further comprising generating the plurality of intermediate optical flow maps using an optical flow model that is trained using a supervised learning algorithm, a set of training data, and a relaxed loss function configured to allow a predetermined amount of error in the estimated optical flow during training of the optical flow refinement model.

9. The method of claim 8, wherein the relaxed loss function comprises an adversarial loss function generated by a generative adversarial network.

10. The method of claim 1, wherein processing the plurality of optical flow maps to generate a first refined optical flow map and processing the plurality of optical flow maps and the first refined intermediate optical flow map to generate a second refined optical flow map is performed using an optical flow refinement model that is trained using an adversarial loss function generated by a generative adversarial network.

11. A computing system comprising:
a processor; and
a memory storing processor-executable instructions thereon, wherein the instructions, when executed by the processor, cause the computing system to:
obtain a plurality of optical flow maps corresponding to a plurality of times between a beginning time and an ending time;
processing the plurality of optical flow maps to generate a first refined optical flow map corresponding to a first intermediate time proximal to the beginning time or ending time;
processing the plurality of optical flow maps and the first refined optical flow map to generate a second refined optical flow map corresponding to a second intermediate time distal from both the beginning time and ending time;
generate a first new intermediate frame based on the first refined optical flow map; and
generate a second new intermediate frame based on the second refined optical flow map.

12. The computing system of claim 11, wherein the instructions, when executed by the processor, further cause the computing system to:
receive a video sequence of a video, comprising:
a beginning frame of the video sequence, the beginning frame corresponding to a beginning time of the video sequence; and
an ending frame of the video sequence, the ending frame corresponding to an ending time of the video sequence;
receive two additional frames of the video corresponding to two additional times, each additional time being either before the beginning time or after the ending time of the video sequence;
generate at least one initial optical flow map corresponding to estimated optical flow between the beginning frame and the ending frame; and
process the at least one initial optical flow map to generate the plurality of intermediate optical flow maps, the plurality of intermediate optical flow maps corresponding to a plurality of intermediate times between the beginning time and ending time of the video sequence, by applying a motion model to the at least one initial optical flow map.

13. The computing system of claim 12, wherein the motion model is cubic or higher in order.

14. The computing system of claim 11, wherein the instructions, when executed by the processor, further cause the computing system to:
Process the plurality of optical flow maps to generate at least one additional refined optical flow map, wherein the first refined optical flow map, the second refined optical flow map, and the at least one additional refined optical flow map constitute a plurality of refined optical flow maps corresponding to the plurality of times; and
generate at least one additional new intermediate frame based on the at least one additional refined optical flow map, wherein the first new intermediate frame, the second new intermediate frame, and the at least one additional new intermediate frame constitute a plurality of new intermediate frames corresponding to the plurality of times.

15. The computing system of claim 14, wherein the instructions, when executed by the processor, further cause the computing system to:
obtain the plurality of new intermediate frames; and
refine the first new intermediate frame and the second new intermediate frame by:
generating a first refined frame corresponding to a first time proximal to the beginning time or ending time, based on the plurality of new intermediate frames; and
generating a second refined frame corresponding to a second time distal from both the beginning time and ending time, based on the plurality of new intermediate frames and the first refined frame.

16. A multi-frame video frame interpolation system, comprising:
an optical flow refinement module configured to:
obtain a plurality of optical flow maps corresponding to a plurality of times between a beginning time and an ending time;
process the plurality of optical flow maps to generate a first refined optical flow map corresponding to a first intermediate time proximal to the beginning time or ending time;
process the plurality of optical flow maps and the first refined intermediate optical flow map to generate a second refined optical flow map corresponding to a second intermediate time distal from both the beginning time and ending time;
generate a first new intermediate frame based on the first refined optical flow map; and
generate a second new intermediate frame based on the second refined optical flow map.

17. The multi-frame video frame interpolation system of claim 16, further comprising:
an optical flow estimation module configured to:
receive a video sequence of a video, comprising:
a beginning frame of the video sequence, the beginning frame corresponding to a beginning time of the video sequence; and
an ending frame of the video sequence, the ending frame corresponding to an ending time of the video sequence;
receive two additional frames of the video corresponding to two additional times, each additional time being either before the beginning time or after the ending time of the video sequence; and generate at least one initial optical flow map corresponding to estimated optical flow between the beginning frame and the ending frame; and a motion modeling module configured to process the at least one initial optical flow map to generate the plurality of intermediate optical flow maps, the plurality of intermediate optical flow maps corresponding to a plurality of intermediate times between the beginning time and ending time of the video sequence, by applying a motion model to the at least one initial optical flow map.

18. The multi-frame video frame interpolation system of claim 17, wherein the motion modeling module is configured to generate the plurality of intermediate optical flow maps using a motion model that is cubic or higher in order.

19. The multi-frame video frame interpolation system of claim 16, wherein the optical flow refinement module is further configured to:

process the plurality of optical flow maps to generate at least one additional refined optical flow ma, wherein the first refined optical flow map, the second refined optical flow map, and the at least one additional refined optical flow map constitute a plurality of refined optical flow maps corresponding to the plurality of times; and generate at least one additional new intermediate frame based on the at least one additional refined optical flow map, wherein the first new intermediate frame, the second new intermediate frame, and the at least one additional new intermediate frame constitute a plurality of new intermediate frames corresponding to the plurality of times.

20. The multi-frame video frame interpolation system of claim 19, further comprising a pixel refinement module configured to:

obtain the plurality of new intermediate frames; and refine the first new intermediate frame and the second new intermediate frame by:

generating a first refined frame corresponding to a first time proximal to the beginning time or ending time, based on the plurality of new intermediate frames; and generating a second refined frame corresponding to a second time distal from both the beginning time and ending time, based on the plurality of new intermediate frames and the first refined frame.

* * * * *